US007941031B2

(12) United States Patent
Tanikawa et al.

(10) Patent No.: US 7,941,031 B2
(45) Date of Patent: May 10, 2011

(54) VIDEO PROCESSING APPARATUS, IC CIRCUIT FOR VIDEO PROCESSING APPARATUS, VIDEO PROCESSING METHOD, AND VIDEO PROCESSING PROGRAM

(75) Inventors: Kentaro Tanikawa, Kadoma (JP); Yuko Tsusaka, Osaka (JP)

(73) Assignee: Panasonic Corporation, Osaka (JP)

( * ) Notice: Subject to any disclaimer, the term of this patent is extended or adjusted under 35 U.S.C. 154(b) by 1517 days.

(21) Appl. No.: 10/560,854

(22) PCT Filed: Jul. 2, 2004

(86) PCT No.: PCT/JP2004/009782
§ 371 (c)(1),
(2), (4) Date: Dec. 15, 2005

(87) PCT Pub. No.: WO2005/004159
PCT Pub. Date: Jan. 13, 2005

(65) Prior Publication Data
US 2006/0143650 A1 Jun. 29, 2006

(30) Foreign Application Priority Data

Jul. 3, 2003 (JP) ................................. 2003-191430

(51) Int. Cl.
*H04N 9/80* (2006.01)
(52) U.S. Cl. ......... 386/241; 386/239; 386/249; 386/250
(58) Field of Classification Search .............. 386/1, 46, 386/52–55, 68, 83, 85, 124–126
See application file for complete search history.

(56) References Cited

U.S. PATENT DOCUMENTS

| 6,496,228 | B1 * | 12/2002 | McGee et al. | 348/700 |
| 7,058,278 | B2 | 6/2006 | Murabayashi | |
| 7,184,100 | B1 * | 2/2007 | Wilf et al. | 348/700 |
| 7,424,204 | B2 * | 9/2008 | Nakamura | 386/95 |
| 7,548,565 | B2 * | 6/2009 | Sull et al. | 370/503 |
| 2002/0085116 | A1 | 7/2002 | Kuwano et al. | |
| 2003/0016945 | A1 | 1/2003 | Nakamura | |

FOREIGN PATENT DOCUMENTS

| EP | 1 016 991 | 7/2000 |
| EP | 1 278 134 | 1/2003 |
| JP | 11-250081 | 9/1999 |
| JP | 2000-250944 | 9/2000 |
| JP | 2001-126050 | 5/2001 |
| JP | 2002-044572 | 8/2002 |
| WO | 99/51022 | 10/1999 |

* cited by examiner

*Primary Examiner* — Peter-Anthony Pappas
*Assistant Examiner* — Marc Dazenski
(74) *Attorney, Agent, or Firm* — Wenderoth, Lind & Ponack, L.L.P.

(57) ABSTRACT

A rule storage unit stores a plurality of pieces of specifying information each showing a feature of frames to be specified as start frames, and each corresponding to a different type of content. A program obtaining unit obtains a content of which start frames are to be specified. An information obtaining unit obtains type information showing the type of the obtained content. A selecting unit obtains, from the rule storage unit, apiece of specifying information corresponding to the obtained type information. A specifying unit specifies, as the start frames, frames in the obtained content having the feature shown by the obtained piece of specifying information.

15 Claims, 23 Drawing Sheets

| OPERATION ID | DETECTION TARGET FRAME | DETECTION PARAMETER | INDEXING OPERATION | SELECTION FRAME | INDEX FRAME |
|---|---|---|---|---|---|
| 001 | LARGE CAPTION START | REGION [(X,Y)-(x,y)], THRESHOLD [x,y] | REGISTER PRESENTATION TIME | 0 | 0 |
| 002 | SMALL CAPTION | REGION [(X,Y)-(x,y)], THRESHOLD [x,y] | DELETE PRESENTATION TIME | 1 | 0 |
| 003 | TRANSITION | — | REGISTER START TIME | 1 | 1 |
| 004 | CM | INTERVALS [15] | DELETE PRESENTATION TIME | 1 | 0 |
| 005 | SILENCE | THRESHOLD [v] | REGISTER START TIME | 1 | 1 |
| 006 | MUSIC START | — | REGISTER START TIME | 1 | 1 |
| 007 | CM START | INTERVALS [15] | REGISTER START TIME | 0 | 0 |
| 008 | TRANSITION | — | REGISTER PRESENTATION TIME | 2 | 2 |
| 009 | SIMILAR IMAGE | REFERENCE FRAME NO. | REGISTER PRESENTATION TIME | 1 | 0 |
| 010 | SPEECH START | — | REGISTER START TIME | 1 | 1 |

| CONTENT ID | GENRE | PROGRAM TITLE |

FIG.4

| 301 PROGRAM TYPE | NUMBER OF OPERATIONS | OPERATION 1 | OPERATION 2 | OPERATION 3 | OPERATION 4 | OPERATION 5 | ... | OPERATION n |
|---|---|---|---|---|---|---|---|---|
| NEWS PROGRAM 1 | 4 | 001 | 004 | 002 | 003 | — | | — |
| NEWS PROGRAM 2 | 4 | 004 | 001 | 002 | 003 | — | | — |
| NEWS PROGRAM 3 | 4 | 001 | 004 | 002 | 005 | — | | — |
| NEWS PROGRAM 4 | 4 | 004 | 001 | 002 | 005 | — | | — |
| NEWS PROGRAM 5 | 4 | 001 | 004 | 002 | 010 | — | | — |
| NEWS PROGRAM 6 | 4 | 004 | 001 | 002 | 010 | — | | — |
| MUSIC SHOW 1 | 4 | 001 | 004 | 002 | 006 | — | | — |
| MUSIC SHOW 2 | 4 | 004 | 001 | 002 | 006 | — | | — |
| INTER-PROGRAM CM | 2 | 007 | 008 | — | — | — | | — |

FIG.5

| OPERATION ID | DETECTION TARGET FRAME | DETECTION PARAMETER | INDEXING OPERATION | SELECTION FRAME | INDEX FRAME |
|---|---|---|---|---|---|
| 001 | LARGE CAPTION START | REGION [(X,Y)-(x,y)], THRESHOLD [x,y] | REGISTER PRESENTATION TIME | 0 | 0 |
| 002 | SMALL CAPTION | REGION [(X,Y)-(x,y)], THRESHOLD [x,y] | DELETE PRESENTATION TIME | 1 | 0 |
| 003 | TRANSITION | — | REGISTER START TIME | 1 | 1 |
| 004 | CM | INTERVALS [15] | DELETE PRESENTATION TIME | 1 | 0 |
| 005 | SILENCE | THRESHOLD [v] | REGISTER START TIME | 1 | 1 |
| 006 | MUSIC START | — | REGISTER START TIME | 1 | 1 |
| 007 | CM START | INTERVALS [15] | REGISTER START TIME | 0 | 0 |
| 008 | TRANSITION | — | REGISTER PRESENTATION TIME | 2 | 2 |
| 009 | SIMILAR IMAGE | REFERENCE FRAME NO. | REGISTER PRESENTATION TIME | 1 | 0 |
| 010 | SPEECH START | — | REGISTER START TIME | 1 | 1 |

| LARGE-TELOP START FRAME |
| --- |
| 00:45 |
| 08:00 |
| 13:00 |
| 19:30 |
| 24:00 |
| 29:00 |
| 30:30 |
| 33:00 |
| 40:00 |
| 45:00 |
| 45:30 |
| 51:15 |
| 58:00 |

FIG.11

| SEGMENT START TIME | PRESENTATION TIME |
|---|---|
| — | 00:45 |
| — | 08:00 |
| — | 13:00 |
| — | 19:30 |
| — | 24:00 |
| — | 29:00 |
| — | 30:30 |
| — | 33:00 |
| — | 40:00 |
| — | 45:00 |
| — | 45:30 |
| — | 51:15 |
| — | 58:00 |

FIG.12

| CM START TIME | CM END TIME |
|---|---|
| 13:00 | 13:30 |
| 13:30 | 14:00 |
| 14:00 | 14:15 |
| 14:15 | 14:30 |
| 29:00 | 29:15 |
| 29:15 | 29:45 |
| 29:45 | 30:15 |
| 30:15 | 30:30 |
| 44:30 | 44:45 |
| 44:45 | 45:00 |
| 45:00 | 45:15 |
| 45:15 | 45:30 |
| 58:00 | 58:30 |
| 58:30 | 59:00 |
| 59:00 | 59:30 |
| 59:30 | 60:00 |

FIG.13

| SEGMENT START TIME | PRESENTATION TIME |
|---|---|
| — | 00:45 |
| — | 08:00 |
| — | — |
| — | 19:30 |
| — | 24:00 |
| — | — |
| — | 30:30 |
| — | 33:00 |
| — | 40:00 |
| — | — |
| — | 45:30 |
| — | 51:15 |
| — | — |

FIG.14

| SMALL-CAPTION START TIME | SMALL-CAPTION END TIME |
|---|---|
| 08:00 | 12:30 |
| 22:45 | 28:00 |
| 32:00 | 43:15 |
| 45:30 | 49:00 |
| 53:15 | 56:45 |

FIG.15

| SEGMENT START TIME | PRESENTATION TIME |
|---|---|
| — | 00:45 |
| — | — |
| — | — |
| — | 19:30 |
| — | — |
| — | — |
| — | 30:30 |
| — | — |
| — | — |
| — | — |
| — | 51:15 |
| — | — |

FIG.16

| TRANSITION FRAME |
|---|
| 00:00 |
| 05:00 |
| 09:30 |
| 12:45 |
| (CM SEGMENT) |
| 19:00 |
| 25:30 |
| 27:00 |
| (CM SEGMENT) |
| 30:30 |
| 34:30 |
| 39:00 |
| 40:15 |
| 43:15 |
| (CM SEGMENT) |
| 50:00 |
| 54:00 |
| 55:15 |
| (CM SEGMENT) |

FIG.17

| SEGMENT START TIME | PRESENTATION TIME |
|---|---|
| 00:00 | 00:45 |
| — | — |
| — | — |
| 19:00 | 19:30 |
| — | — |
| — | — |
| 30:30 | 30:30 |
| — | — |
| — | — |
| — | — |
| — | — |
| 50:00 | 51:15 |
| — | — |

VIDEO PROCESSING APPARATUS, IC CIRCUIT FOR VIDEO PROCESSING APPARATUS, VIDEO PROCESSING METHOD, AND VIDEO PROCESSING PROGRAM

BACKGROUND OF THE INVENTION

1. Field of Invention

The present invention relates to indexing technology for dividing a content into a plurality of segments based on video and audio analysis of the content.

2. Description of the Related Art

In recent years, large capacity recording apparatuses, such as HDD recorders and DVD recorders, have become widespread for home use. It is becoming common that such a recording apparatus is provided with a function of automatically and selectively recording broadcast contents according to a user's interests and preferences. Owing to this function, it is expected that such a recording apparatus stores a larger amount of contents than ever.

With such a function, broadcast programs as shown by an EPG (Eclectic Program Guide) are recorded as contents. Generally, users seldom watch a recorded content from the beginning to the end, but selectively view specific parts of the content. For example, a user may view a specific piece of news in a news program that interests the user or a specific part of a music show in which the user's favorite singer makes an appearance. In this way, users can effectively retrieve desired information from a large amount of content data.

To this end, attempts have been made to analyze a content for extracting various features of video and audio data. The content is then indexed using the extracted features in combination, and thus divided into a plurality of segments (hereinafter, "viewing segments").

Specifically, for example, a technique of detecting a transition frame at which a series of frames that are sequentially shot as one scene changes to another scene, is used in combination with a technique of detecting a frame in which a telop (television opaque projector) effect or a caption appears. The use of the techniques allows the detection of frames each located closest to a caption frame among all the transition frames preceding the caption frame. The detected frames are then compared with each other to measure the similarity therebetween. The segmentation is carried out in such a manner that each of the similar frames belongs to a different viewing segment.

However, a problem arises as a result of an increasing number of terrestrial television channels as well as the versatility of available broadcasting styles including satellite broadcasting, cable broadcasting, and video streaming. That is, more and more types of contents are available for viewing at home, so that conventionally known techniques may be insufficient to suitably index all the types of contents.

This insufficiency arises because each genre or broadcast program is different in the segmentation pattern associated with features, such as the size, layout, appearance timing of captions.

BRIEF SUMMARY OF THE INVENTION

In view of the above problem, the present invention has an object to provide a video processing apparatus, an IC circuit for a video processing apparatus, a video processing method, and a video processing program each capable of indexing various types of contents more suitably than conventionally known techniques.

To achieve the above object, the present invention provides a video processing apparatus for specifying frames to be start frames of a plurality of viewing segments when segmenting a content. The video processing apparatus includes: a specifying information memory storing pieces of specifying information each showing a feature of frames to be specified as start frames and each corresponding to a different type of content; a content obtaining unit operable to obtain a content; an information obtaining unit operable to obtain type information showing the type of the obtained content; an extracting unit operable to extract from the specifying information memory a piece of specifying information corresponding to the type shown by the obtained type information; and a specifying unit operable to specify start frames present in the content, in accordance with the extracted piece of specifying information.

With the structure stated above, the video processing apparatus stores a plurality of pieces of specifying information and uses a different piece of specifying information depending on a type of content. This means that indexing of a content is performed in accordance with a specific piece of specifying information that is selected in view of the features of audio and image data of the content. Consequently, it is ensured that the video processing apparatus can appropriately segment various types of contents into a plurality of viewing segments.

Here, each piece of specifying information may further show a feature of frames to be specified as presentation frames, each of which is to be displayed as a representative still image of a respective viewing segment. The specifying unit may further specify presentation frames present in the content, in accordance with the extracted piece of specifying information.

With the structure stated above, a pair of a start frame and a presentation frame is specified for each viewing segment. When the image of a start frame is not suitable as a representative image for a corresponding segment, a more suitable frame is specified as a presentation frame. With the still image display of the thus specified presentation frame, users can readily identify what is recorded in the viewing segment.

Here, the video processing apparatus may further include an index storage unit operable to store, in correspondence with the content, display times of each start frame and presentation frame specified by the specifying unit.

With the structure stated above, the viewing segments of a content are managed in terms of the display times.

Here, the features shown by the specifying information may be detectable through at least one of video analysis, still image analysis, and audio analysis. The specifying unit may specify the start frames and presentation frames through at least one of video analysis, still image analysis, and audio analysis.

With the structure stated above, it is ensured that a variety of types of contents is suitably indexed using an image analysis technique and/or an audio analysis technique.

Here, the specifying information may include: a first condition showing a feature of frames to be detected as candidates for presentation frames; an exclusion condition showing a feature of frames to be excluded from candidates for presentation frames; a second condition showing a feature of frames to be detected as candidates for start frames; and a selection condition showing a relation between a presentation frame and a frame that is to be selected as a start frame. The specifying unit may specify the presentation frames by detecting frames satisfying the first condition from all frames present in the content and subsequently excluding frames satisfying the exclusion condition from the detected frames, and specify the start frames by detecting frames satisfying the second condition from all the frames present in the content and subsequently selecting, from the detected frames, frames satisfying the relation shown by the selection condition with respect to the specified presentation frames.

Further, the specifying unit may include: a plurality of detecting subunits each operable to detect frames having a different feature; an excluding subunit operable to exclude frames satisfying the exclusion condition from frames satisfying the first condition; and a selecting subunit operable to select frames satisfying the relation shown by the selection condition from frames satisfying the second condition. The first condition, the exclusion condition, and the second condition each may be an identifier of one of the detecting subunits to be used.

With the structures stated above, a content is segmented into a plurality of viewing segments by specifying a first frame of each segment based on a plurality of features taken in combination. This allows the segmentation to be carried out more accurately on a scene-by-sense basis than the segmentation based on a single feature.

Here, when operating in accordance with a piece of specifying information corresponding to a predetermined type of content, the specifying unit may (i) detect from all the frames present in the content, large-caption start frames each of which is a first frame of a series of frames during which a caption of a size larger than a threshold continuously appears in a predetermined region, small caption frames in each of which a caption of a size smaller than a threshold appears in a region other than the predetermined region, CM frames which constitute a commercial message, and transition frames each of which is a first frame of a series of frames of similar images, (ii) specify as a presentation frame each frame remaining after removing the small-caption frames and the CM frames from the large-caption start frames, and (iii) specify as a start frame, for each presentation frame, a closest preceding transition frame to the presentation frame.

With the structure stated above, each presentation frame specified is a frame that is not a CM frame but a large-caption frame without a small caption. Further, each start frame specified is a transition frame that is closest to a presentation frame among all the transition frames preceding the presentation frame.

Suppose that the predetermined type of content is a broadcast program structured to contain a plurality of viewing segments with a scene transition between adjacent segments. In addition, a caption presenting a summary or headline of a corresponding segment appears immediately after each scene transition. In this case, each frame in which such a caption appears is determined as a presentation frame, whereas each frame at which a scene transition takes place is specified as a start frame. To be more specific, an example of the predetermined type of content is a news program in which a scene transition takes place between two successive news stories and a news headline is displayed after the scene transition. Consequently, such a news program is appropriately segmented into a plurality of viewing segments each precisely corresponds to one news story.

Here, when operating in accordance with a piece of specifying information corresponding to a predetermined type of content, the specifying unit may (i) exclude frames which constitute a commercial message from all the frames present in the content, (ii) detect from the remaining frames, large-caption start frames each of which is a first frame of a series of frames during which a caption of a size larger than a threshold continuously appears in a predetermined region, small caption frames in each of which a caption of a size smaller than a threshold appears in a region other than the predetermined region, and transition frames each of which is a first frame of a series of frames of similar images, (iii) specify as a presentation frame each frame remaining after removing the small-caption frames from the large-caption start frames, and (iv) specify as a start frame, for each presentation frame, a closest preceding transition frame to the presentation frame.

With the structure stated above, it is ensured to suitably index a broadcast program in which a scene transition takes place between adjacent viewing segments, and a caption presenting a headline of a corresponding segment appears immediately after the scene transition. It is also ensured that the processing amount required for detecting frames having the feature shown by the specifying information is reduced, and thus the processing time is shortened.

Here, when operating in accordance with a piece of specifying information corresponding to a predetermined type of content, the specifying unit may (i) detect from all the frames present in the content, large-caption start frames each which is a first frame of a series of frames during which a caption of a size larger than a threshold continuously appears in a predetermined region, small caption frames in each of which a caption of a size smaller than a threshold appears in a region other than the predetermined region, CM frames which constitute a commercial message, and silent frames of which audio data is below a predetermined volume level, (ii) specify as a presentation frame each frame remaining after removing the small-caption frames and the CM frames from the large-caption start frames, and (iii) specify as a start frame, for each presentation frame, a closest silent frame to the presentation frame.

With the structure stated above, each presentation frame specified is a frame that is not a CM frame but a large-caption frame without a small caption. Further, each start frame specified is a frame at which a silent segment immediately preceding a presentation frame ends.

Suppose that the predetermined type of content is a broadcast program in which pieces of audio data are contained and the beginning of each piece of audio data coincides with the beginning of a viewing segment. In addition, a caption presenting a headline of a respective viewing segment is displayed after the viewing segment starts. In this case, each frame in which such a caption appears is determined as a presentation frame, whereas each frame, at which sound represented by a piece of audio data starts, is specified as a start frame. To be more specific, an example of the predetermined type of content is a news program in which a silence takes place between two successive news stories and a news headline is displayed after the sound reporting the news story begins. Such a news program is appropriately segmented into a plurality of viewing segments each precisely corresponds to one news story.

Here, when operating in accordance with a piece of specifying information corresponding to a predetermined type of content, the specifying unit may (i) exclude frames which constitute a commercial message from all the frames present in the content, (ii) detect from the remaining frames, large-caption start frames each of which is a first frame of a series of frames during which a caption of a size larger than a threshold continuously appears in a predetermined region, small caption frames in each of which a caption of a size smaller than a threshold appears in a region other than the predetermined region, and silent frames of which audio data is below a predetermined volume level, (iii) specify as a presentation frame each frame remaining after removing the small-caption frames from the large-caption start frames, and (iv) specify as a start frame, for each presentation frame, a closest preceding silent frame to the presentation frame.

With the structure stated above, it is ensured to suitably index a broadcast program in which a silence takes place between adjacent viewing segments and a caption presenting a headline of a respective viewing segment is displayed immediately after the sound starts. In addition, the processing amount required for detecting frames having the feature shown by the specifying information is reduced, and thus the processing time is shortened.

Here, when operating in accordance with a piece of specifying information corresponding to a predetermined type of music program, the specifying unit may (i) detect from all the frames present in the content, large-caption start frames each of which is a first frame of a series of frames during which a caption of a size larger than a threshold continuously appears in a predetermined region, small caption frames in each of which a caption of a size smaller than a threshold appears in a region other than the predetermined region, CM frames which constitute a commercial message, and music-start frames each of which is a first frame of a series of frames of which audio data represents a piece of music data, (ii) specify as a presentation frame each frame remaining after removing the small-caption frames and CM frames from the large-caption start frames, and (iii) specify as a start frame, for each presentation frame, a closest preceding music-start frame to the presentation frame.

With the structure stated above, each presentation frame specified is a frame that is not a CM frame but a large-caption frame without a small caption. Each start frame specified is a first frame of a series of frames constituting a music segment that is the closest preceding music segment to a presentation frame.

Suppose that the predetermined type of content is a music show in which a plurality of pieces of music is played and a caption presenting a title or writer of a corresponding music piece appears soon after the music starts. In this case, each frame in which such a caption appears is specified as a presentation frame, whereas each frame corresponding to the start of music is specified as a start frame. Consequently, such a music show is appropriately segmented into a plurality of viewing segments each precisely corresponds to one piece of music.

Here, when operating in accordance with a piece of specifying information corresponding to a predetermined type of music program, the specifying unit may (i) exclude frames which constitute a commercial message from all the frames present in the content, (ii) detect from the remaining frames, large-caption start frames each of which is a first frame of a series of frames during which a caption of a size larger than a threshold continuously appears in a predetermined region, small caption frames in each of which a caption of a size smaller than a threshold appears in a region other than the predetermined region, and music-start frames each of which is a first frame of a series of frames of which audio data represents a piece of music data, (iii) specify as a presentation frame each frame remaining after removing the small-caption frames from the large-caption start frames, and (iv) specify as a start frame, for each presentation frame, a closest preceding music-start frame to the presentation frame.

With the structure stated above, it is ensured to suitably index a music show in which a plurality of pieces of music is played and a caption presenting a title or writer of a corresponding music piece appears soon after the piece of music starts. It is also ensured that the processing amount required for detecting frames having the feature shown by the specifying information is reduced, and thus the processing time is shortened.

Here, when operating in accordance with a piece of specifying information corresponding to a predetermined type of content, the specifying unit may (i) detect from all the frames present in the content, large-caption start frames each of which is a first frame of a series of frames during which a caption of a size larger than a threshold continuously appears in a predetermined region, small caption frames in each of which a caption of a size smaller than a threshold appears in a region other than the predetermined region, CM frames which constitutes a commercial message, and speech-start frames each of which is a first frame of a series of frames of which audio data represents a speech of a specific speaker, (ii) specify as a presentation frame each frame remaining after removing the small-caption frames and the CM frames from the large-caption start frames, and (iii) specify as a start frame, for each presentation frame, a closest preceding speech-start frame to the presentation frame.

With the structure stated above, each presentation frame specified is a frame that is not a CM frame but a large-caption frame without a small caption. Further, each start frame specified is a first frame of a series of frames that constitute a speech segment that is the closest preceding speech segment to a presentation frame.

Suppose that the predetermined type of content is a broadcast program in which a specific speaker starts talking at the beginning of each viewing segment, and a caption presenting a headline of the segment viewing appears thereafter. In this case, each frame in which such a caption appears is specified as a presentation frame, whereas each frame at which the speaker starts talking is specified as a start frame. To be more specific, an example of the predetermined type of content is a news program or educational program in which one speaker talks on a plurality of topics with a silent gap between two successive topics, and a caption presenting a topic headline is displayed after a speech on the topic starts. Such a broadcast program is appropriately segmented into a plurality of viewing segments each precisely corresponds to ones topic.

Here, when operating in accordance with a piece of specifying information corresponding to a predetermined type of content, the specifying unit may (i) exclude frames which constitute a commercial message from all the frames present in the content, (ii) detect from the remaining frames, large-caption start frames each of which is a first frame of a series of frames during which a caption of a size larger than a threshold continuously appears in a predetermined region, small caption frames in each of which a caption of a size smaller than a threshold appears in a region other than the predetermined region, and speech-start frames each of which is a first frame of a series of frames of which audio data represents a speech of a specific speaker, (iii) specify as a presentation frame each frame remaining after removing the small-caption frames from the large-caption start frames, and (iv) specify as a start frame, for each presentation frame, a closest preceding speech-start frame to the presentation frame.

With the structure stated above, it is ensured to suitably index a broadcast program in which a caption appears for each topic to present a headline of a corresponding topic. It is also ensured that the processing amount required for detecting frames having the feature shown by the specifying information is reduced, and thus the processing time is shortened.

Here, when operating in accordance with a piece of specifying information corresponding to a predetermined type of content, the specifying unit may (i) detect from all the frames present in the content, CM-start frames each of which is a first frame of a series of frames which constitute a commercial message, and transition frames each of which is a first frame of a series of frames of similar images, (ii) specify each CM-start frame as a start frame, and (iii) specify as a presentation frame, for each start frame, a closest subsequent transition frame to the start frame.

With the structure stated above, each CM contained in a content is segmented as one viewing segment.

Here, the video processing apparatus may further include a playback unit operable to play back the content starting from a start frame specified by the specifying unit.

With the structure stated above, the video processing apparatus can play back a content starting from the beginning of a viewing segment. Thus, users are allowed to view a content starting from the beginning of a viewing segment.

Here, the video processing apparatus may further include: an index storing unit operable to store pairs display times of each start frame and presentation frame specified for a respective viewing segment by the specifying unit; a display unit operable to display a presentation frame specified for each viewing segment by the specifying unit; and a user-selection unit operable to select at least one of the presentation frames displayed, in accordance with a user selection. The playback unit may play back the content starting from a start frame of a viewing segment to which the user-selected presentation frame belongs.

With the structure stated above, users are allowed to select a viewing segment of the users interest by viewing the presentation frames each help, with is caption for example, the users to identify what is recorded in a respective viewing segment. Further, the users are allowed to view the content starting from the beginning of the thus selected viewing segment.

Here, the display unit may display the presentation frames by generating a thumbnail image of each presentation frame and displaying the thumbnail images in list form.

With the structure stated above, users are allowed to easily select a viewing segment of the users' interest by examining the thumbnail images of the presentation frames displayed in list form.

Here, the user-selection unit may store the selected presentation frame as a reference image into the specifying information memory. The specifying unit may specify the presentation frames by detecting frames which are similar to the reference image with respect to a location of a region in which a caption appears.

With the structure stated above, the presentation frame selected by a user for viewing is used as a reference frame for future specification of presentation frames. That is, each frame of which image is similar to that of the reference frame is specified as a presentation frame when the next indexing is performed. Since the reference frame is already viewed by the user, the thus specified presentation frames, which are similar to the reference frame, help the user to identify what is recorded in a respective viewing segment. In addition, each time playback and indexing is repeated, it becomes easier for the user to identify what is recorded in a respective viewing segment.

Here, the video processing apparatus may further include a recording unit operable to obtain a content and type information of the content, and to record the content to a recording medium in correspondence with the type information. After the recording unit records the type information and at least part of the content, the content obtaining unit may sequentially obtain the part of the content from the recording medium. The specifying unit may sequentially specify start frame present in the part of the content obtained by the content obtaining unit.

With the structure stated above, the processing to specify start frames is performed in parallel with recording of the content.

In other words, indexing of a content is started without waiting for the entire content to be recorded, so that it is no longer necessary to take time to index the entire content after recording is completed. Consequently, the video processing apparatus allows users to use contents without worrying about the time required for indexing.

Here, the video processing apparatus may further include a recording unit operable to obtain a content and type information of the content, encode the content, and record the encoded content in correspondence with the type information. After the recording unit records the type information and encodes at least part of the content, the content obtaining unit may sequentially obtain the encoded part of the content. The specifying unit may obtain analyses of the encoded part conducted by the recording unit for the encoding, and sequentially specifies start frame present in the encoded part using the analyses.

With the structure stated above, the results obtained in a process of compression coding a content are used in the detection of caption appearance and scene transition.

As a result, the processing amount required for indexing is reduced, and thus the processing time is shortened.

Here, the video processing apparatus may further include an updating unit operable to obtain a new version of specifying information corresponding to a specific type of content, and record the new version of specifying information to the specifying information memory.

With the structure stated above, the video processing apparatus of the present invention can obtain a new version of specifying information, and specify start frames of a content using the new version of specifying information.

Here, the updating unit may obtain the new version of specifying information when connected via a communication network to a provider apparatus for providing specifying information, and judging that the new version of specifying information is available. The new version of specifying information is recorded to the specifying information memory by updating a piece of specifying information stored therein corresponding to the specific type to the new version.

With the structure stated above, the video processing apparatus of the present invention can judge whether the provider apparatus has a new version of specifying information, and obtain the new version if available.

Consequently, the video processing apparatus of the present invention can make an attempt to update the specifying information at a desired timing.

Here, the judgment as to whether the new version of specifying information is available may be made each time the specifying unit processes the specific type of content.

With the structure stated above, it is ensured that the segmentation of a content is carried out always in accordance with the latest version of specifying information.

In another aspect, the present invention provides an integrated circuit for use in a video processing apparatus that specifies frames to be start frames of a plurality of viewing segments when segmenting a content. The video processing apparatus has a specifying information memory storing pieces of specifying information each showing a feature of frames to be specified as start frames and each corresponding to a different type of content. The integrated circuit includes: a content obtaining module operable to obtain a content; an information obtaining module operable to obtain type information showing the type of the obtained content; an extracting module operable to extract from the specifying information memory a piece of specifying information corresponding to the type shown by the obtained type information; and a specifying module operable to specify start frames present in the content, in accordance with the extracted piece of specifying information.

With the structure stated above, a different one of a plurality of pieces of specifying information is used depending on a type of content. This means that indexing of a content is performed in accordance with a specific piece of specifying information that is selected in view of the features of audio and image data of the content. Consequently, it is ensured that the video processing apparatus can appropriately segment various types of contents into a plurality of viewing segments.

In yet another aspect, the present invention provides a video processing method for use by a video processing apparatus that specifies frames to be start frames of a plurality of viewing segments when segmenting a content. The video processing apparatus has a specifying information memory storing pieces of specifying information each showing a feature of frames to be specified as start frames and each corresponding to a different type of content. The video processing method includes the steps of: obtaining a content; obtaining a type information showing a type of the obtained content; extracting from the specifying information memory a piece of specifying information corresponding to the type shown by the obtained type information; and specifying start frames present in the content, in accordance with the extracted piece of specifying information.

With the structure stated above, a different one of a plurality of pieces of specifying information is used depending on a type of content. This means that indexing of a content is performed in accordance with a specific piece of specifying information that is selected in view of the features of audio and image data of the content. Consequently, it is ensured that the video processing apparatus can appropriately segment various types of contents into a plurality of viewing segments.

In yet another aspect, the present invention provides a video processing program for causing a device to specify frames to be start frames of a plurality of viewing segments when segmenting a content. The device has a specifying information memory storing pieces of specifying information each showing a feature of frames to be specified as start frames and each corresponding to a different type of content. The video processing program includes the steps of: obtaining a content; obtaining a type information showing a type of the obtained content; extracting from the specifying information memory a piece of specifying information corresponding to the type shown by the obtained type information; and specifying start frames present in the content, in accordance with the extracted piece of specifying information.

With the structure stated above, a different one of a plurality of pieces of specifying information is used depending on a type of content. This means that indexing of a content is performed in accordance with a specific piece of specifying information that is selected in view of the features of audio and image data of the content. Consequently, it is ensured that the video processing apparatus can appropriately segment various types of contents into a plurality of viewing segments.

BRIEF DESCRIPTION OF THE DRAWINGS

FIG. 3 is a view showing a data structure of type information;

FIG. 4 is a view showing a data structure of a rule table 301 stored in a rule storage unit 106;

FIG. 5 is a view showing a data structure of a detection operation table 302 stored in the rule storage unit 106;

FIG. 10 is a view showing a list of the display times of large-caption start frames detected by a large-caption detecting unit 142 in accordance with the detection operation instruction having an operation ID 001;

FIG. 11 is a view showing the index information of the content 401 after the detection operation instruction having the operation ID 001 is processed;

FIG. 12 is a view showing a list of the display times of CM frames detected by a CM detecting unit 145 in accordance with the operation detection instruction having an operation ID 004;

FIG. 13 is a view showing the index information of the content 401 after the detection operation instruction having the operation ID 004 is processed;

FIG. 14 is a view showing a list of the display times of small-caption frames detected by a small-caption detecting unit 143 in accordance with the detection operation instruction having an operation ID 002;

FIG. 15 is a view showing the index information of the content 401 after the detection operation instruction having the operation ID 002 is processed;

FIG. 16 is a view showing a list of the display times of transition frames detected by a transition detecting unit 141 in accordance with the operation detection instruction having an operation ID 003;

FIG. 17 is the index information of the content 401 after the index processing is completed according to the rule that corresponds to "News Program 1";

DETAILED DESCRIPTION OF THE INVENTION

Hereinafter, description is given to embodiments of the present invention, with reference to the accompanying drawings.

Embodiment 1

Overview

In an embodiment 1 of the present invention, description is given to a recording apparatus 100 that index a content. To be more specific, the recording apparatus 100 specifies presentation frames and start frames from a series of frames constituting a content, thereby segmenting the content into a plurality of viewing segments. Note that a presentation frame is a frame from which a user can readily tell what is recorded in a corresponding viewing segment, whereas a start frame is the first frame of the viewing segment.

Further, viewing segments in this description refer to units of video data obtained by segmenting a content in a manner that each unit represents a coherent or continuous scene.

The recording apparatus 100 stores pieces of specifying information each showing conditions of frames to be specified as presentation frames and start frames, and uses a different piece of the specifying information according to the type (genre and/or program title) of a content.

Structure

Figure 1:
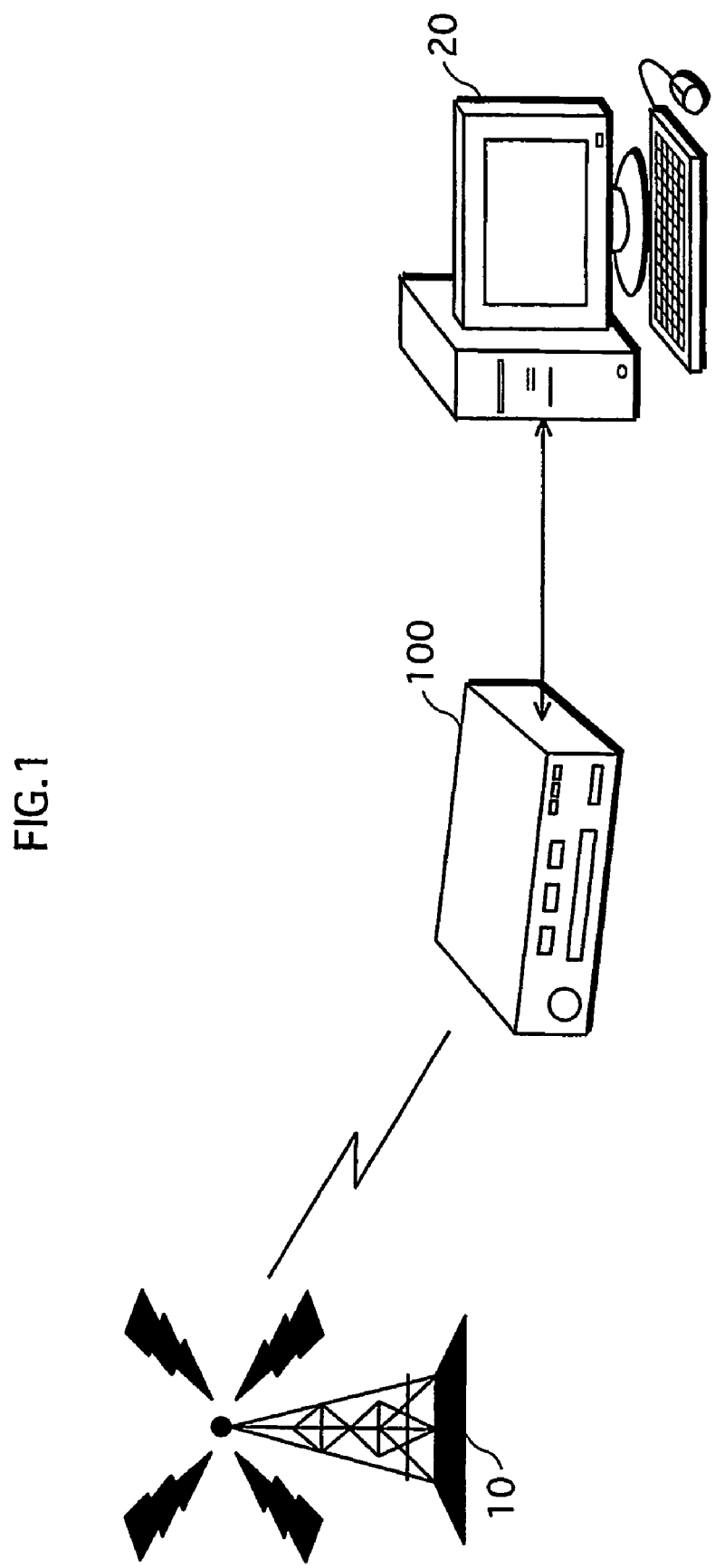
FIG. 1 is a view showing a usage pattern of a recording apparatus 100 according to an embodiment 1 of the present invention.

FIG. 1 shows a usage pattern of the recording apparatus 100.

A broadcast station 10 broadcasts data such as EPG data about genres, titles, broadcast schedule of broadcast programs, and also broadcasts contents over broadcast waves.

A provider apparatus 20 may be a computer connected to the recording apparatus 100 via a communication network, such as the Internet. The provider apparatus 20 stores the latest version of specifying information (i.e. rules and detection operation instructions) in a memory, such as a built-in HDD, and supplies the specifying information to the recording apparatus 100 upon request. Note that details of the specifying information will be described later.

Specifically, the recording apparatus 100 may be a DVD recorder with a built-in HDD, a DVD recorder, or a HDD recorder. The recording apparatus 100 receives broadcast waves transmitted from the broadcast station 10, and records contents carried by the broadcast waves. The recording apparatus 100 has an automatic recording function of selectively recording contents that might fit the user's interests and preferences, with reference to an EPG received on the broadcast waves. In addition, the recording apparatus 100 has an indexing function of segmenting a recorded content into a plurality of viewing segments.

The recording apparatus 100 includes a processor, a RAM, and a ROM having a program recorded therein, and performs the indexing function by the processor executing the program.

Hereinafter, description is given to the structure of the recording apparatus 100.

Figure 2:
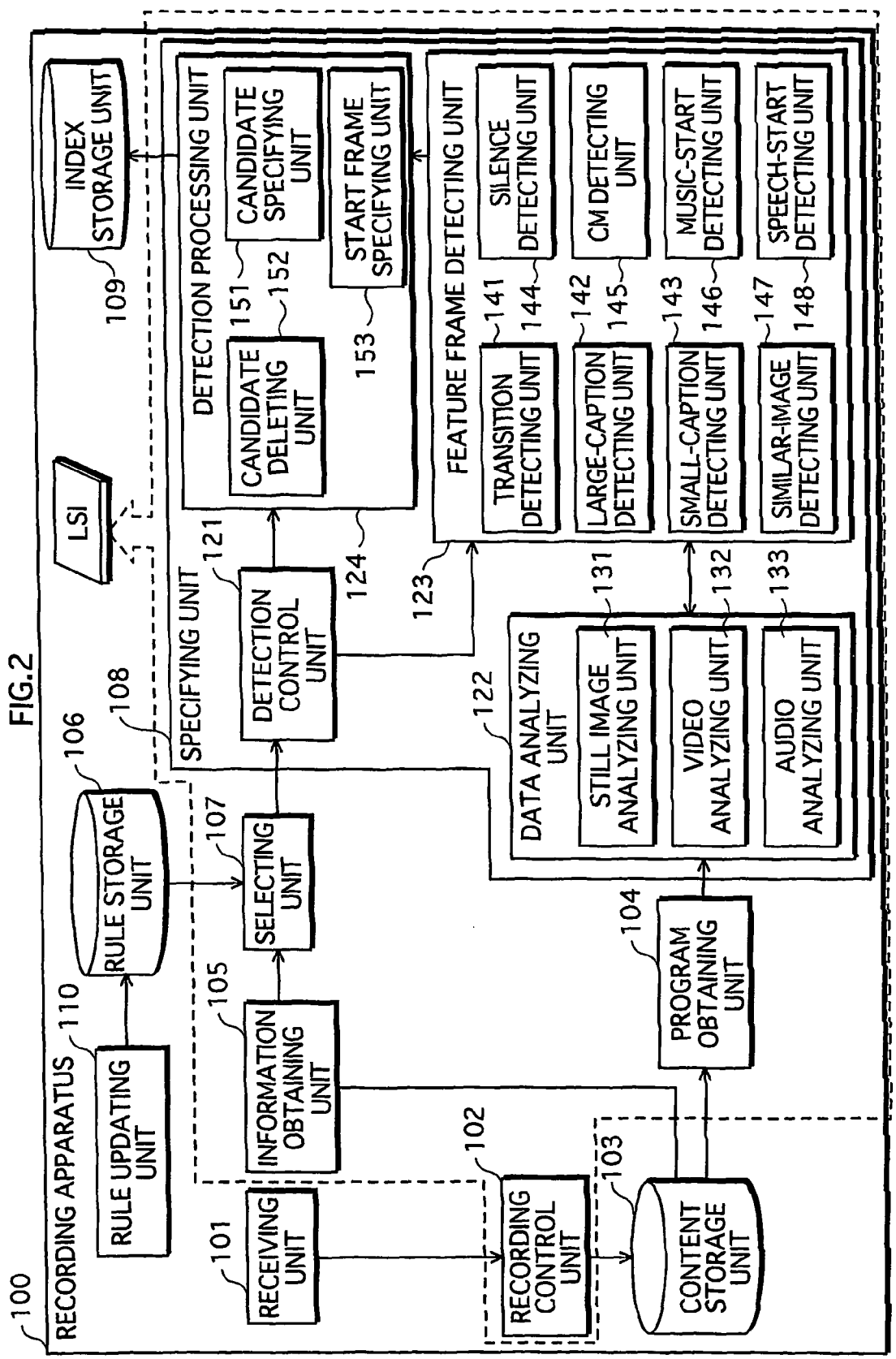
FIG. 2 is a view showing functional blocks of the recording apparatus 100.

FIG. 2 shows functional blocks of the recording apparatus 100, related to the indexing function. As shown in the figure, the recording apparatus 100 includes a receiving unit 101, a recording control unit 102, a content storage unit 103, a program obtaining unit 104, an information obtaining unit 105, a rule storage unit 106, a selecting unit 107, a specifying unit 108, an index storage unit 109, and a rule updating unit 110.

The receiving unit 101 may be constituted by an antenna and a receiving circuit. The receiving unit 101 receives broadcast waves transmitted from the broadcast station 10, and outputs to the recording control unit 102, a content and an EPG obtained from the received broadcast waves.

The recording control unit 102 is a functional block for controlling recording operations, such as recording of contents at a user request, preset recording, and automatic recording of contents that match the user's interests and preferences. The recording control unit 102 digitizes a content received from the receiving unit 101, then compresses the digital content by coding, using compression coding method, such as an MPEG-2 (Moving Picture Experts Group phase 2), and records the compressed content to the content storage unit 103. At the time of recording the content, the recording control unit 102 generates type information composed of the genre and program title of the content with reference to the EPG, and records the type information to the content storage unit 103 in correspondence with the content.

Since already known in the art, no detailed description is given to the techniques of automatic recording in accordance with the users' interests and preferences and of preset recording.

Specifically, the content storage unit 103 is a recording medium, such as a hard disk or a DVD, and stores contents in correspondence with the type information of the contents. Each content stored in the content storage unit 103 is composed of video and audio data. The video data is in turn composed of a set of frames (still images) arranged in a time sequence, and the audio data contains sound for each frame. As shown in FIG. 3, the type information is composed of a content ID, a genre, and a program title. The content ID is an identifier uniquely identifying a corresponding content stored in the content storage unit 103. The content ID may be assigned by the recording apparatus 100 at the time of recording the content. Instead, the program ID used in the EPG may be simply used as the content ID.

Generally, contents broadcast in compliance with the NTSC (National Television System Committee) system is composed of 30 frames per second, and the display time of each frame (time elapsed from the beginning of content) may be specified in approximately 33 ms intervals. In this embodiment, however, the display time of each frame is specified in seconds for the simplicity sake.

Each time a new content is stored to the content storage unit 103, the program obtaining unit 104 obtains the content from the content storage unit 103, and outputs the obtained content to the specifying unit 108.

Each time the program obtaining unit 104 obtains a content, the information obtaining unit 105 obtains type information corresponding to the content from the content storage unit 103, and outputs the obtained type information to the selecting unit 107.

Specifically, the rule storage unit 106 is a recording medium, such as a hard disk or a DVD, or a rewritable non-volatile memory, such as an EEPROM. The rule storage unit 106 stores a rule table 301 and a detection operation table 302. In addition, the rule storage unit 106 has a reference frame storage area, and stores a reference frame with a frame ID for each rule contained in the rule table 301. The reference frames are used by a later-described similar-image detecting unit 147 for image analysis.

In the embodiment 1, each piece of specifying information is composed of one rule and detection operation instructions that are designated by the rule.

Each detection operation instruction instructs to register the display time of a presentation frame (hereinafter, "presentation time") to the index storage unit 109, to delete a registered presentation time from the index storage unit 109, or to register the display time of a start frame (hereinafter, "segment-start time") to the index storage unit 109. To be more specific, each detection operation instruction includes information showing a condition of a frame of which display time is subjected to a registration or deletion operation to or from the index storage unit 109, along with information showing the operation to be performed (i.e. information showing one of the presentation time registration, presentation time deletion, or segment-start time registration).

Each rule is information showing the number of detection operation instructions with its order to be performed by a detection control unit 121 for indexing a content of a corresponding type, thereby segmenting the content into a plurality of viewing segments.

Hereinafter, description is given in detail to the rule table 301 and the detection operation table 302.

FIG. 4 shows the data structure of the rule table 301 stored in the rule storage unit 106.

The rule table 301 contains a different rule for each genre of content.

Each rule is composed of a program type, the number of operation instructions, and as many operation IDs as that number.

The program type shows a corresponding genre of content, and the number of operations shows how many detection operation instructions are designated.

The operation IDs are identifications of detection operation instructions, and listed in the order to be performed for indexing.

For example, the rule for "News Program 1" shows that the detection operation instructions identified by the operation IDs 001, 004, 002, and 003 need to be performed in the stated order.

FIG. 5 shows the data structure of the detection operation table 302 stored in the rule storage unit 106.

The detection operation table 302 contains detection operation instructions. Each detection operation instruction shows a condition of frames to be subjected to display time registration or deletion to or from the index storage unit 109, along with information showing which of the operations (i.e. presentation time registration, presentation time deletion, and segment-start time registration) is to be performed.

Each detection operation instruction is information composed of an operation ID, a detection-target frame, a detection parameter, an indexing operation, a selection frame, and an index frame.

The operation ID uniquely identifies a detection operation instruction.

The detection-target frame shows a feature of frames to be detected by a feature frame detecting unit 123. The detection parameter is a parameter used by the feature frame detecting unit 123 for the feature frame detection.

The indexing operation is information instructing a detection processing unit 124 to perform either presentation time registration, presentation time deletion, or segment-start time registration. To be more specific, the indexing operation is set to: "presentation time registration" when a presentation time needs to be registered; "presentation time deletion" when a presentation time needs to be deleted; and "segment-start time registration" when a segment-start time needs to be registered.

The selection frame is information showing a frame used to specify an index frame of which display time is to be registered or deleted by the detection processing unit 124. The selection frame is set to either of the values 0, 1, and 2. The value 0 indicates a detection-target frame, the value 1 indicates a registered presentation, and the value 2 indicates a registered start frame.

The index frame shows an index frame, which is a frame of which display time needs to be registered or deleted. The index frame is shown by a relation between a selection frame and a detection-target frame. To be more specific, the index frame is set to either of the values 0, 1, and 2. The value 0 indicates that a detection-target frame that matches a selection frame is determined as an index frame. The value 1 indicates a closest preceding detection-target frame to a selection frame (i.e. a frame that is closest to a selection frame among all the detection-target frames preceding the selection frame) is determined as an index frame. The value 2 indicates a closest subsequent detection-target frame to the selection frame (i.e. a frame that is closest to a selection frame among all the detection-target frames that are located subsequent to the selection frame) is determined as an index frame.

For example, the detection operation instruction having the operation ID 001 instructs the feature frame detecting unit 123 to detect every "large-caption start frame". A large-caption start frame is a first frame of a series of frames during which a caption of a size larger than a threshold [(x, y)] continuously appears in a region defined by a detection parameter [(X-Y), (x, y)]. In addition, the detection processing unit 124 is instructed to specify, as an index frame, every detection-target frame (i.e. large-caption start frame, in this case) that matches a selection frame (i.e. large-caption start frame, in this case), and to register the display time of the thus specified index frame as a presentation time to the index storage unit 109.

Further, the detection operation instruction having the operation ID 002 instructs the feature frame detecting unit 123 to detect every "small-caption frame". A "small-caption frame" is a frame in which a caption of a size smaller than a threshold [(x, y)] appears in a region defined by a detection parameter [(X, Y)–(x, y)]. In addition, the detection processing unit 124 is instructed to specify, as an index frame, every detection-target frame (small-caption frame) that matches a selection frame (registered presentation frame), and to delete the display time of the thus specified index frame from the presentation times registered in the index storage unit 109.

Further, the detection operation instruction having the operation ID 003 instructs the feature frame detecting unit 123 to detect a transition frame at which a transition from one continuous scene to another takes place (i.e. a frame of a scene boundary). In addition, the detection processing unit 124 is instructed to specify, as an index frame, a closest preceding detection-target frame (transition frame) to a selection frame (registered presentation frame), and to register the display time of the thus specified index frame as a segment-start time to the index storage unit 109.

The selecting unit 107 shown in FIG. 2 obtains from the rule table 301, a rule corresponding to the type information obtained from the program obtaining unit 104. In addition, the selecting unit 107 obtains from the detection operation table 302, a detection operation instruction identified by each operation ID contained in the obtained rule. The obtained rule and detection operation instruction are outputted to the specifying unit 108. In the case where the obtained rule contains a plurality of operation IDs, the selecting unit 107 outputs corresponding detection operation instructions to the specifying unit 108 in the order of the operation IDs listed in the rule.

The specifying unit 108 includes the detection control unit 121, the data analyzing unit 122, the feature frame detecting unit 123, and the detection processing unit 124. The specifying unit 108 is a functional block that specifies, for segmenting a content into a plurality of viewing segments, frames to be start frames of viewing segment, out of a plurality of frames constituting image data of the content obtained by the program obtaining unit 104.

The detection control unit 121 obtains detection operation instructions one by one from the selecting unit 107 in the order shown by the rule. For each detection operation instruction obtained, the detection control unit 121 outputs a detection parameter shown by the detection operation instruction to the feature frame detecting unit 123, and controls the feature frame detecting unit 123 and the detection processing unit 124.

The data analyzing unit 122 is a functional block for decoding a content obtained by the program obtaining unit 104, and analyzing the decoded content under the control of the feature frame detecting unit 123 so as to extract features of the video and audio data. To this end, the data analyzing unit 122 includes functional blocks of a still image analyzing unit 131, a video analyzing unit 132, and an audio analyzing unit 133.

The still image analyzing unit 131 analyzes the luminance and color distribution of each frame.

The video analyzing unit 132 analyzes the changes in the luminance and color between adjacent frame pairs.

The audio analyzing unit 133 performs the volume level measurement, waveform analysis, and voice recognition, based on the decoded audio data.

The feature frame detecting unit 123 includes functional blocks of a transition detecting unit 141, a large-caption detecting unit 142, a small-caption detecting unit 143, a silence detecting unit 144, a CM (commercial message) detecting unit 145, a music-start detecting unit 146, the similar-image detecting unit 147, and a speech-start detecting unit 148. The feature frame detecting unit 123 detects frames having later-described features from the content under the control of the detection control unit 121. The frame detection is performed based on the analyses obtained by the data analyzing unit 122. The feature frame detecting unit 123 outputs the display time of each detected frame to the detection processing unit 124.

To be more specific, the transition detecting unit 141 detects a transition frame at which a transition from one scene to another takes place. Note that a scene is represented by a series of frames that are shot continuously. To be more specific, the transition detecting unit 141 detects all the transition frames in the content by a predetermined algorithm using the changes in the color distribution between adjacent frame pairs. The display time of each transition frame detected is outputted to the detection processing unit 124.

The large-caption detecting unit 142 is a functional block that detects large-caption start frames. To this end, the large-caption detecting unit 142 obtains parameters, i.e. coordinates defining the predetermined region and the threshold of the caption size from the detection control unit 121. The large-caption detecting unit 142 then detects all the large-caption start frames by a predetermined algorithm using the obtained parameters as well as using the time-based changes between adjacent frame pairs in the number of luminance-based horizontal edge pixels. The display time of each large-caption start frame detected is outputted to the detection processing unit 124.

The small-caption detecting unit 143 is a functional block that detects small-caption frames. To this end, the small-caption detecting unit 143 obtains parameters, i.e. coordinates defining the predetermined region and the threshold of the caption size from the detection control unit 121. The small-caption detecting unit 143 then detects all the small-caption frames by a predetermined algorithm using the obtained parameters as well as using the number of luminance-based horizontal edge pixels. The display time of each small-caption frame detected, is then outputted to the detection processing unit 124.

As above, the large-caption detecting unit 142 and the small-caption detecting unit 143 perform the detection through image analyses. Yet, a content may contain meta data, such as closed-captions, about its captions. In such a case, the detection may be performed using the meta data and thus without conducting image analyses.

The silence detecting unit 144 detects a silent frame of which sound level is below a threshold, using a predetermined algorithm. The display time of each silent frame detected is outputted to the detection processing unit 124.

The CM detecting unit 145 detects CM frames constituting a CM, using a predetermined algorithm. To be more specific, the CM detecting unit 145 detects, as CM frames, frames corresponding to a segment during which silence is repeated at predetermined time intervals (15 seconds, for example). The display time of each CM frame detected is outputted to the detection processing unit 124.

The music-start detecting unit 146 detects using a predetermined algorithm, a music-start frame which is a first frame of a series of frames through which a feature sound periodically repeats. The display time of each music-start frame detected is outputted to the detection processing unit 124.

The similar-image detecting unit 147 first obtains from the reference frame storing area of the rule storage unit 106, a reference frame that is designated by a parameter obtained from the detection control unit 121. The similar-image detecting unit 147 then compares each frame corresponding to a presentation time registered in the index information unit 109 to see whether an image of the presentation frame is similar to the reference frame image. In this way, the similar-image detecting unit 147 detects frames which are similar on the image data basis to the reference frame image from the presentation frames. The display time of each similar-image frame detected is outputted to the detection processing unit 124.

The detection of similar-image frames may be performed in various ways. For example, the display position of a main caption characteristic to the reference frame is designated as a reference region, and the number of horizontal edge pixels in the region is designated as a feature index. The similarity between each frame pair is measured based on the feature index. Alternatively, the display position of a caption in the reference frame may be designated as a feature index so as to detect frames with a caption displayed at a similar position. Still further, the similarity between each frame pair may be measured based on other features.

The speech-start detecting unit 148 detects, on the audio data basis, a speech-start frame which is a first frame of a series of frames through which a speech of a specific speaker continues. The detection is carried out using a predetermined algorithm and the display time of each speech-start frame detected, is outputted to the detection processing unit 124.

The detection processing unit 124 includes functional blocks of a candidate specifying unit 151, a candidate deleting unit 152, and a start frame specifying unit 153. Under the control by the detection control unit 121, the detection processing unit 124 rewrites the index information held in the index storage unit 109.

The candidate specifying unit 151 registers a presentation time to the index information. The candidate deleting unit 152 deletes a registered presentation time from the index information. The start frame specifying unit 153 registers a segment-start time to the index information.

Specifically, the index storage unit 109 is a recording medium, such as a hard disk or a DVD, and stores index information for each content stored in the content storage unit 103. The index information is composed of a segment-start time and a presentation time for each viewing segment of a respective content.

The rule updating unit 110 is a functional block for updating the rule table 301 and detection operation table 302 stored in the rule storage unit 106, by obtaining the latest version of specifying information (rules and detection operation instructions) from the provider apparatus 20 over the communication network.

Each time the recording control unit 102 starts recording a content, the rule updating unit 110 inquires the provider apparatus 20 as to whether there is a new version of specifying information corresponding to the content being processed. This inquiry is made before the selecting unit 107 selects a corresponding piece of the specifying information. When there is a new version, the rule updating unit 110 obtains the new version.

With the structure stated above, the recording apparatus 100 stores a plurality of pieces of specifying information, and uses a suitable piece of specifying information for a content of each genre. This ensures that indexing is suitably performed for various types of contents with the provision of pieces of specifying information composed of a suitable algorithm for each genre of contents.

As stated above, the functions of the recording control unit 102, the program obtaining unit 104, the information obtaining unit 105, the selecting unit 107, the specifying unit 108, and the rule updating unit 110 are performed by the processor executing the program stored in the ROM. Alternatively, however, those functions may be performed using, for example, wired logic or an ASIC (application-specific integrated circuit).

Processing

Next, description is given to the processing performed by the recording apparatus 100 for indexing a content.

Figure 6:
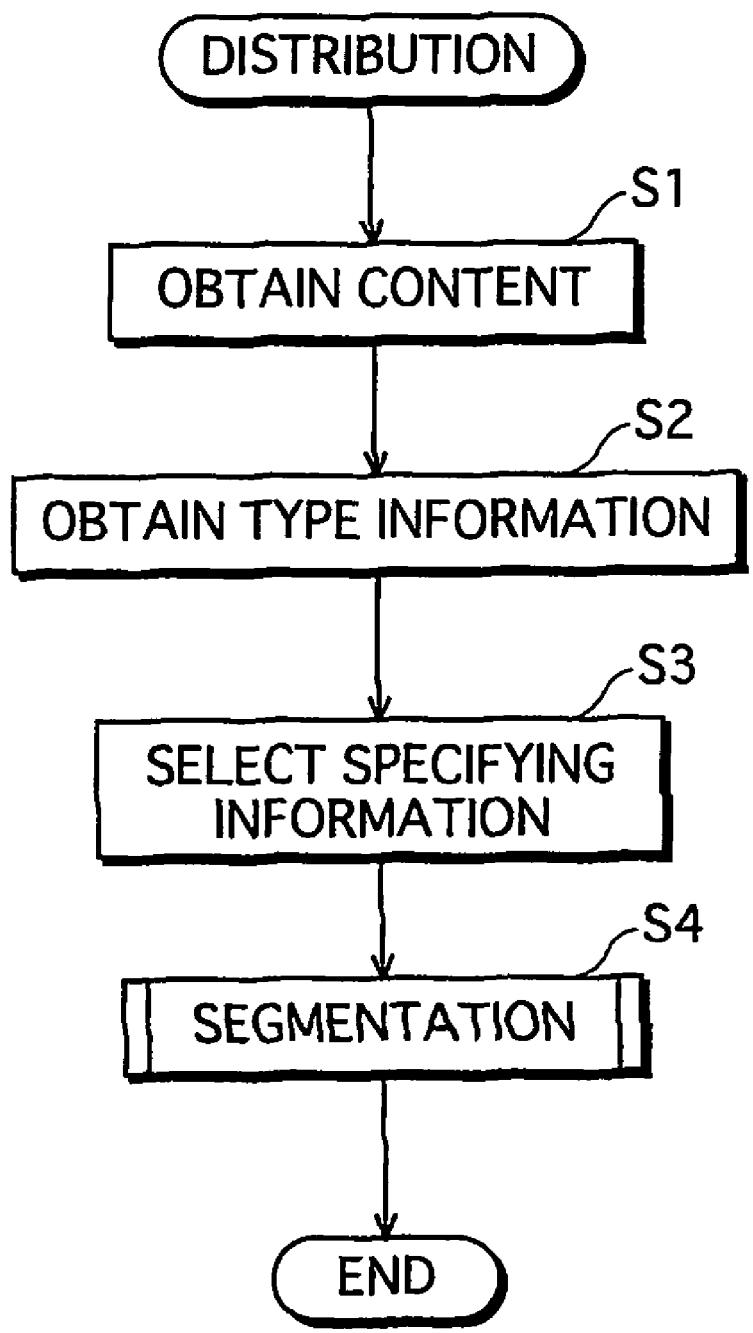
FIG. 6 is a flowchart of the index processing performed by the recording apparatus 100.

FIG. 6 is a flowchart of the index processing performed by the recording apparatus 100.

First, the program obtaining unit 104 obtains a recorded content from the content storage unit 103, and outputs the obtained content to the specifying unit 108 (S1).

Next, the information obtaining unit 105 obtains, from the content storage unit 103, a piece of type information corresponding to the content obtained in the step S1, and outputs the obtained type information to the selecting unit 107 (S2). The selecting unit 107 then searches the rule table 301 held in the rule storage unit 106 to retrieve a rule that corresponds to the "genre" shown by the obtained type information. The selecting unit 107 also searches the detection operation table 302 to retrieve a detection operation instruction identified by each operation ID contained in the obtained rule. The obtained rule and detection operation instructions are outputted to the specifying unit 108 (S3).

The specifying unit 108 performs the segmentation processing based on the rule and detection operation instructions obtained from the selecting unit 107, by specifying a start frame of each viewing segment out of all the frames that together constitute video data of the content obtained from the program obtaining unit 104 (S4). In the above manner, the index processing is completed.

Through the above steps, it is ensured that the recording apparatus 100 of the embodiment 1 suitably indexes a content using a piece of specifying information that corresponds to the type of the content.

Next, description is given in more detail to the segmentation processing shown as the step S4 in FIG. 6. The segmentation processing is to specify start frames, thereby segmenting a content into a plurality of viewing segments.

Figure 7:
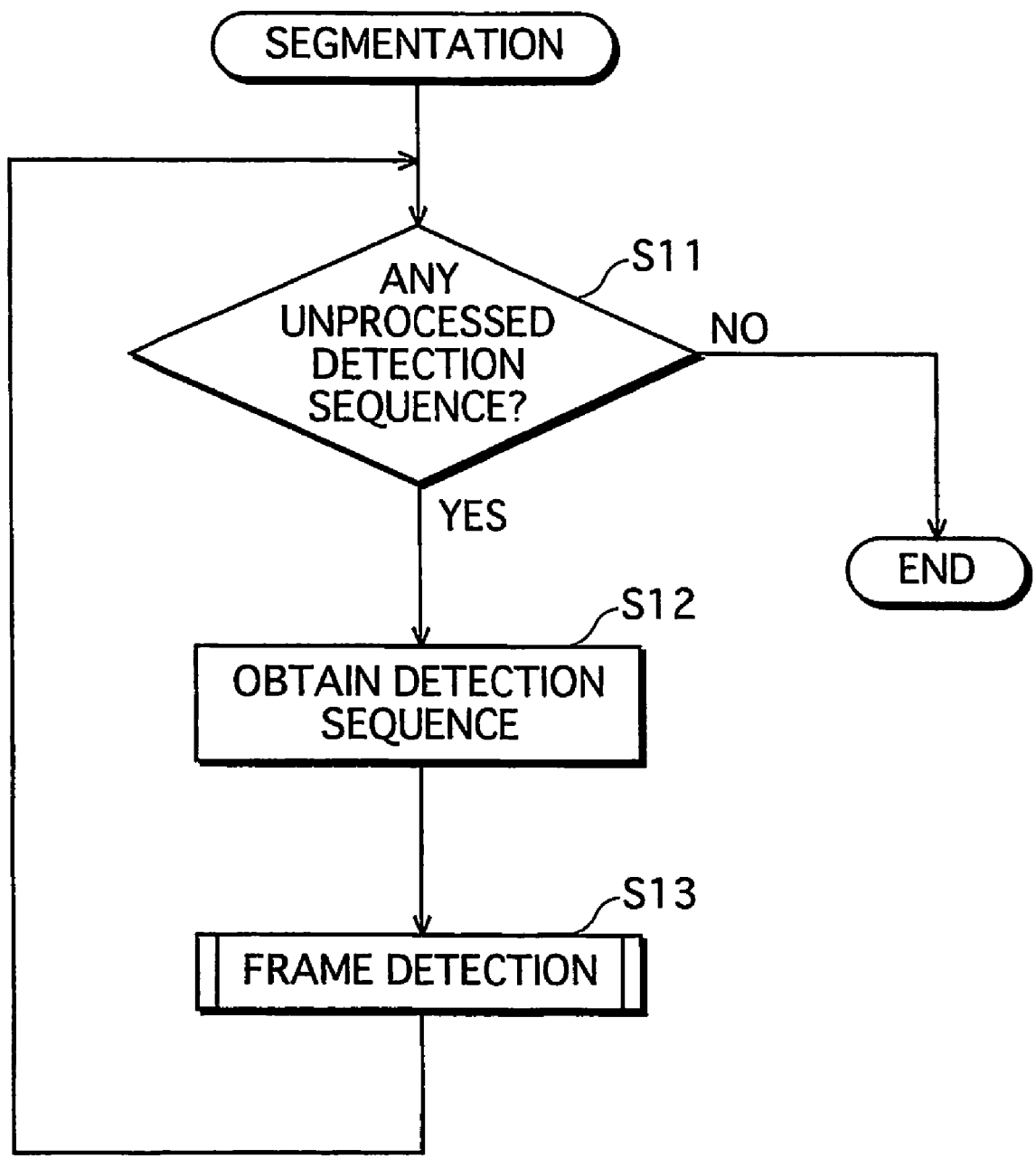
FIG. 7 is a flowchart of the segmentation processing.

FIG. 7 is a flowchart of the segmentation processing.

First, the detection control unit 121 judges whether any of the detection operation instructions obtained by the selecting unit 107 remains unprocessed (S11).

When there are unprocessed detection operation instructions (S11: YES), the detecting control unit 121 selects a first one of the unprocessed detection operation instructions in the order listed in the rule (S12). Based on the thus selected detection operation instruction, the detecting control unit 121 performs the frame detection processing by controlling the feature frame detecting unit 123 and the detection processing unit 124. Thorough the frame detection processing, frames satisfying the condition shown by the current detection operation instruction are specified, and the index information held in the index storage unit 109 is updated accordingly (S13).

After the frame detection processing, the detecting control unit 121 goes back to the step S11 for similarly processing the next detection operation instruction.

The detecting control unit 121 repeats the above steps until there is no more detection operation instruction left unprocessed (S11: NO). As a result, a segment-start time and a presentation time of each of a plurality of viewing segments are registered to the index information.

Through the above steps, the specifying unit 108 processes the detection operation instructions one by one in the order shown by the rule selected by the selecting unit 107.

Next, description is given in more detail to the frame detection processing shown as the step S13 in FIG. 7. The frame detection processing is performed by the feature frame detecting unit 123 and the detection processing unit 124 in order to detect frames that satisfy the conditions shown by the detection operation instructions and to update the index information using the detected frames.

Figure 8:
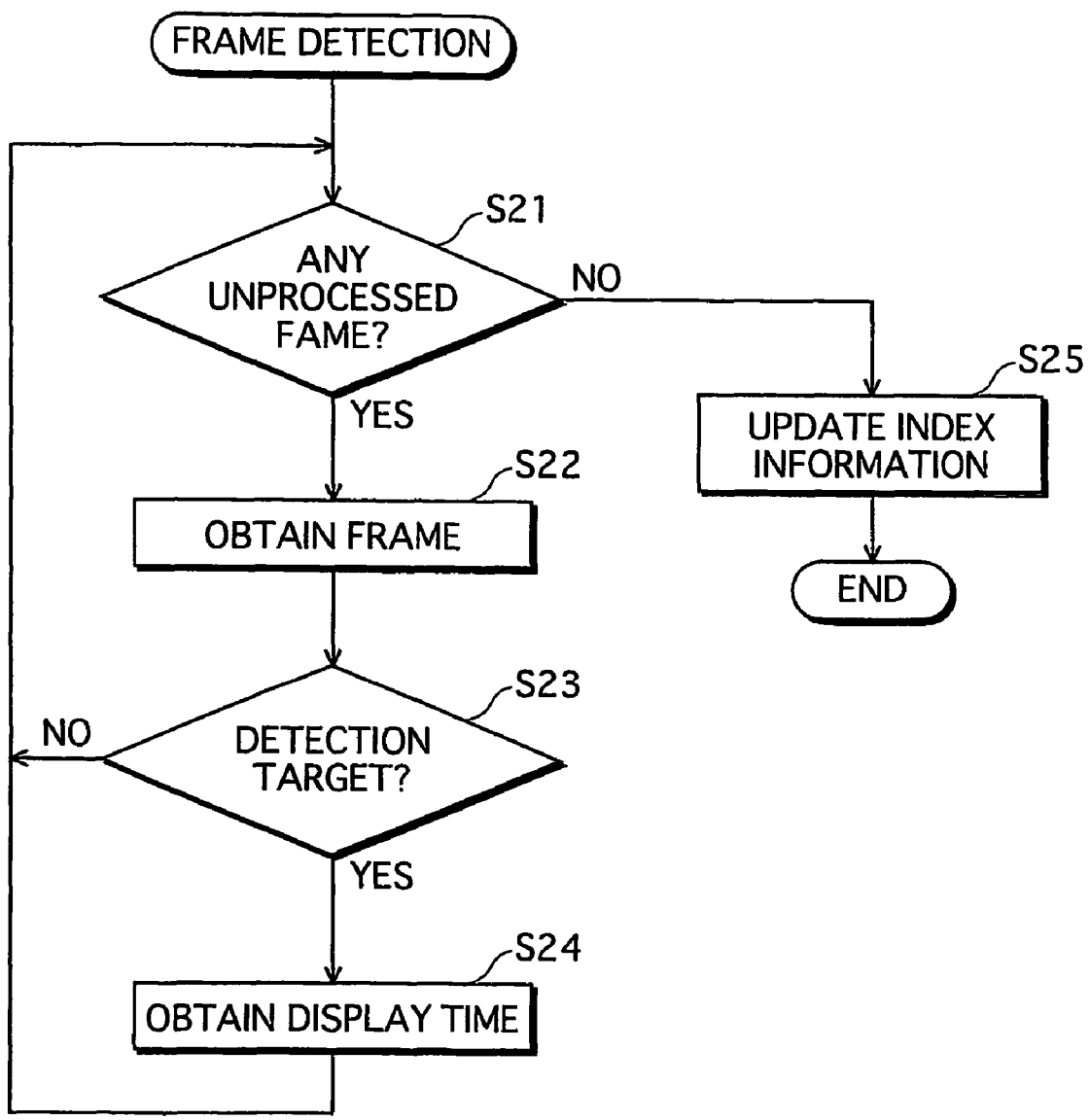
FIG. 8 is a flowchart of the frame detection processing.

FIG. 8 is a flowchart of the frame detection processing.

First, the feature frame detecting unit 123 judges whether any of the frames constituting the content obtained by the program obtaining unit 104 remains unanalyzed (S21).

When there are unanalyzed frames (S21: YES), the feature frame detecting unit 123 selects the first one of the unanalyzed frames (S22). With the use of its functional blocks, the feature frame detecting unit 123 then judges whether the current frame is a detection-target frame satisfying the condition shown by the current detection operation instruction (step S23). When the frame being analyzed is not a detection-target frame (S23: NO), the feature frame detecting unit 123 goes back to the step S21 to analyze the next frame. On the other hand, when the frame being analyzed is a detection-target frame (S23: YES), the feature frame detecting unit 123 records the display time of the frame into a work area secured in a memory (S24). The processing then goes back to the step S21 to analyze the next frame.

The feature frame detecting unit 123 repeats the above steps to generate on the work area, a list of display times of all the detection-target frames found in the content. Upon completion of the frame analysis for the entire content (S21: NO), the detection processing unit 124 obtains the list of display times from the work area, and updates the index information in accordance with the detection operation instruction, using the obtained display times of detection-target frames and the selection frames shown by the current detection operation instruction (S25).

Through the above steps, it is ensured that the feature frame detecting unit 123 duly detects all target frames from the frames constituting image data of the content, in accordance with the detection operation instructions.

Example 1

Hereinafter, description is given to a specific example of the index processing performed on a content 401 by the recording apparatus 100. In this example, the content 401 is a 60-minute news program.

Figure 9:
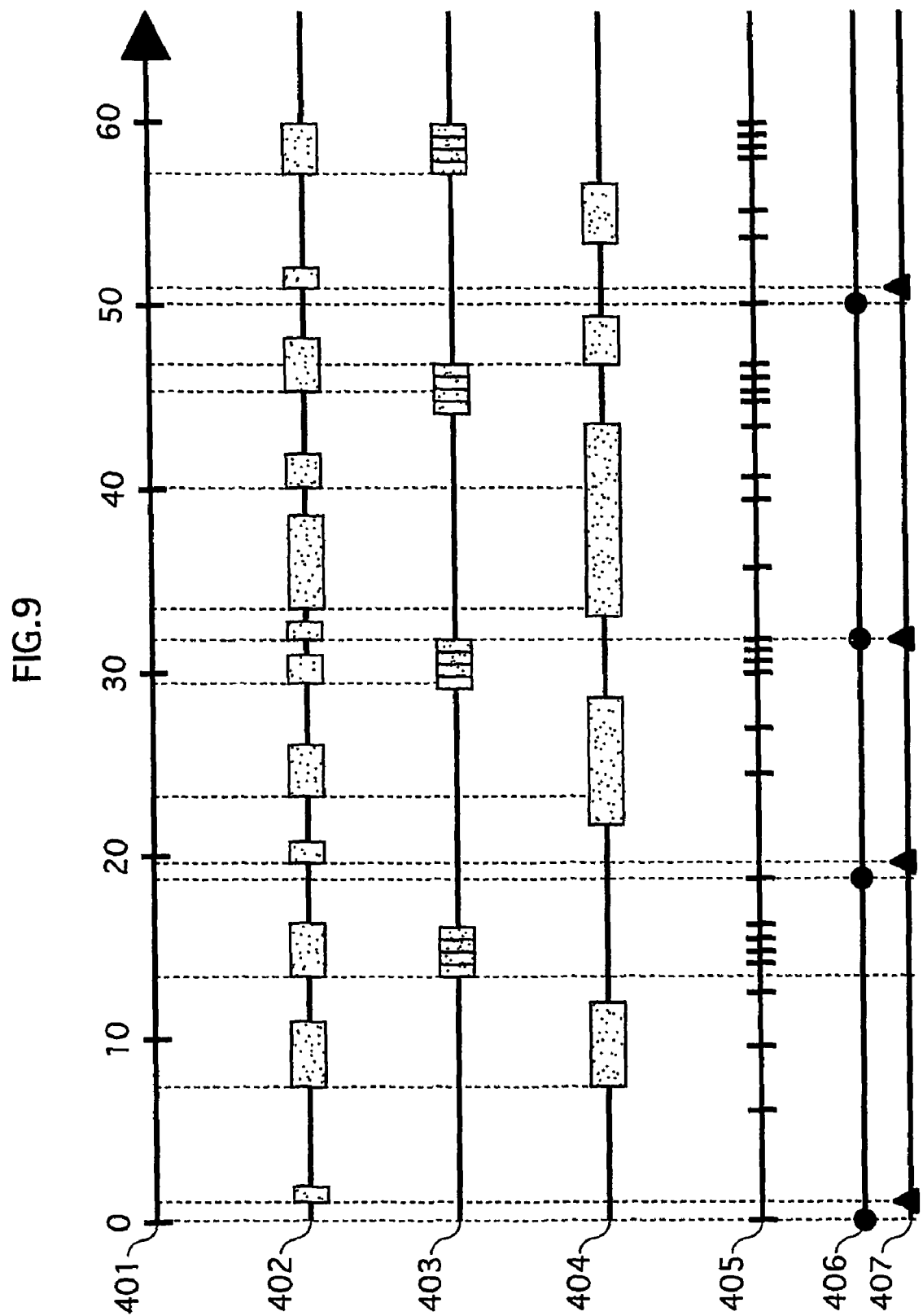
FIG. 9 is a view schematically showing the image data features of a content 401, which is an example of a content.

FIG. 9 is a view schematically showing the image data features of the content 401. The horizontal axes in the figure are time axes. The numerals above the time axes represent the elapsed time (in minutes) from the start of the content 401.

Rectangles along the time axis 402 each represent a segment during which a large-caption appears in a region at the bottom of each frame. Rectangles along the time axis 403 each represent a segment corresponding to a CM inserted for a purpose of advertising. Rectangles along the time axis 404 each represent a segment during which a small-caption appears in the region other than the bottom region. Vertical lines along the time axis 405 each represent a scene transition at which a transition from one continuous scene to another takes place.

Here, the content 401 to be indexed belongs to the genre "News Program 1". Thus, the selecting unit 107 obtains a rule corresponding to "News Program 1" from the rule table 301 shown in FIG. 4. The rule contains four operation IDs 001, 004, 002, and 003. Thus, the selecting unit 107 further obtains four detection operation instructions identified by the operation IDs, from the detection operation table 302 shown in FIG. 5. Then, the selecting unit 107 outputs the obtained rule and detection operation instructions to the specifying unit 108.

The specifying unit 108 sequentially performs the frame detection processing in accordance with the respective detection operation instructions one by one in the order of the operation IDs listed in the rule corresponding to "News Program 1".

First, the frame detection processing is performed in accordance with the detection operation instruction identified by the operation ID 001, which is the first ID shown by the rule. To this end, the large-caption detecting unit 142 detects all the large-caption start frames contained in the content 401. Then, the candidate specifying unit 151 registers, as a presentation time, the display time of each detected frame to the index information.

FIG. 10 shows a list of the display times of large-caption start frames detected by the large-caption detecting unit 142 in accordance with the detection operation instruction having the operation ID 001. FIG. 11 shows the index information of the content 401 after the detection operation instruction having the operation ID 001 is processed.

Next, a detection operation instruction identified by the second operation ID 004 is processed. Thus, the CM detecting unit 145 detects all the CM frames from the content 401. FIG. 12 shows a list of the display times of CM frames detected by the CM detecting unit 145 in accordance with the operation detection instruction having the operation ID 004. In practice, the CM detecting unit 145 detects all the CM frames contained in the content 401. For the simplicity sake, however, FIG. 12 shows the start time and end time of each CM segment.

Upon completion of the CM frame detection by the CM detecting unit 145, the candidate deleting unit 152 alters the index information by deleting every segment-start time that matches the display time of any CM frame detected.

To be more specific, from the index information shown in FIG. 11, the presentation times "13:00", "29:00", "45:00", and "58:00" are deleted. FIG. 13 shows the index information of the content 401 after the detection operation instruction having the operation ID 004 is processed.

Next, a detection operation instruction identified by the third operation ID 002 is processed. To this end, the small-caption detecting unit 143 detects all the small-caption frames contained in the content 401. FIG. 14 shows a list of the display times of small-caption frames detected by the small-caption detecting unit 143 in accordance with the detection operation instruction having the operation ID 002. Similarly to FIG. 12, FIG. 14 shows the start and end times of each segment during which a small caption continuously appears, thereby indicating the display time of each small-caption frame.

Upon completion of the small-caption detection by the small-caption detecting unit 143, the candidate deleting unit 152 alters the index information by deleting every segment-start time that matches the display time of any small-caption frame detected.

To be more specific, from the index information shown in FIG. 13, the presentation times "08:00", "24:00", "33:00", "40:00", and "45:30" are deleted. FIG. 15 shows the index information of the content 401 after the detection operation instruction having the operation ID 002 is processed.

Next, a detection operation instruction identified by the fourth operation ID 003 is processed. To this end, the transition detecting unit 141 detects all the transition frames contained in the content 401. FIG. 16 shows a list of the display times of transition frames detected by the transition detecting unit 141 in accordance with the operation detection instruction having an operation ID 003. In practice, the transition detecting unit 141 detects transition frames contained in the content 401, including ones contained in CM segments. Yet, the display time of any transition frame in a CM segment is not included in the list for the following reason. According to the detection operation instruction having the operation ID 002, the presentation frames contained in CM segments have been already excluded from the index information. That is to say, the transition frames present in CM segments are never specified as index frames (which is a closest preceding transition frame to a presentation frame). For this reason, FIG. 6 omits the display times of transition frames that are contained in CM segments.

On completion of the transition frame detection by the transition detecting unit 141, the start frame specifying unit 153 specifies a closest preceding transition frame to each registered presentation frame, and registers the display time of each thus specified index frame as a segment-start time.

To be more specific, when the index information includes the presentation times "00:45", "19:30", "30:30", and "51:15" as shown in FIG. 15, the segment-stat times "00:00", "19:00", "30:30", and "50:00" are registered. FIG. 17 shows the index information of the content 401 after the index processing is completed according to the rule that corresponds to "News Program 1".

In FIG. 9, black dots along the time axis 406 represent frames specified as start frames, whereas black triangles along the time axis 407 represent frames specified as presentation frames.

Through the above steps, it is ensured to suitably perform the indexing of a news program in which a caption appears for each news story to present a summary or headline of the news story.

To be more specific, when indexing such a new program, a presentation frame will be each frame in which a caption providing the headline of a news story appears, whereas a start frame will be each frame at which a scene transition takes place to an image of an announcer reporting the news story.

Figure 18A:
FIGS. 18A, 18B, and 18C are views showing examples of frames contained in the content 401.
Figure 18B:
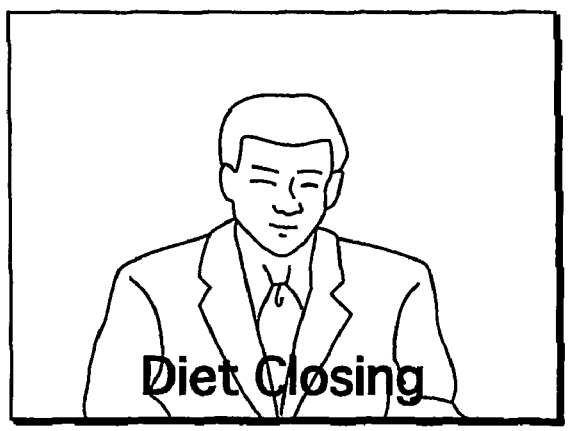
Figure 18C:
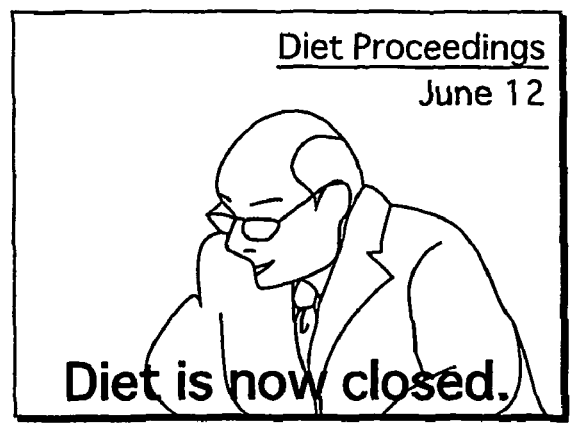

FIG. 18A shows an image of an exemplary start frame, whereas FIG. 18B shows an image of an exemplary presentation frame. FIG. 18C is a image of an exemplary frame of which display time is once registered as a presentation frame according to the detection operation instruction having the operation ID 001, and then deleted according to the detection operation instruction having the operation ID 002. In the end, the frame shown in FIG. 18C is not specified as a presentation frame.

Example 2

Next, description is given to another example of the index processing performed by the recording apparatus 100.

Suppose that the content 401 in this example belongs to the genre "News Program 3". Consequently, the rule that corresponds to "News Program 3" is obtained from the rule table 301.

The rule corresponding to "News Program 3" includes the operation IDs 001, 004, 002, and 005 in the stated order. Thus, when the index processing is performed in accordance with the rule corresponding to "News Program 3", the first three detection operation instructions (of which operation IDs are 001, 004, and 002) are performed in the same way as the Example 1.

Thereafter, the detection operation instruction identified by the forth operation ID 005 is performed. To this end, the silence detecting unit 144 detects all the silent frames from the content 401.

On completion of the silent frame detection, the start frame specifying unit 153 specifies a closest preceding frame to each presentation frame among all the silent frames detected. The start frame specifying unit 153 then registers the display time of each thus specified silent frame as a segment-start time to the index information.

The above steps ensure to suitably perform indexing of such a news program in which a caption appears for each news story to present a headline thereof.

To be more specific, a presentation frame and a start frame are specified for each news story. Each presentation frame specified in this case is a first frame in which a caption presenting the headline appears. Each start frame specified in this case is the last frame of a series of frames constituting a silence segment that immediately precedes audio data reporting the news story.

Example 3

Hereinafter, description is given to yet another example of the index processing performed by the recording apparatus 100.

Suppose that the content 401 in this example belongs to the genre "Music Show 1". Consequently, the rule that corresponds to "Music Show 1" is obtained from the rule table 301.

The rule corresponding to "Music Show 1" includes the operation IDs 001, 004, 002, and 006 in the stated order. Thus, when indexing of the content 401 is performed in accordance with the rule corresponding to "Music Show 1", the first three detection operation instructions (of which operation IDs are 001, 004, and 002) are performed in the same way as the Example 1.

Thereafter, the detection operation instruction which is identified by the fourth operation ID 006 is processed. To this end, the music-start detecting unit 146 detects all the music-start frames from the content 401.

On completion of the music-start frame detection, the start frame specifying unit 153 specifies a start frame for each presentation frame registered in the index information. The start frame specified in this case is a closest preceding frame to each presentation frame among all the music-start frames.

The above steps ensure to suitably perform indexing of such a music show in which a caption presenting the title and writer of each piece of music appears after the music starts.

To be more specific, a presentation frame and a start frame are specified for each piece of music played in the music show. Each start frame specified in this case is a frame at which a piece of music starts. Each presentation frame specified in this case is a frame in which a caption about the music piece, such as a title, first appears.

Example 4

Next, description is given to yet another example of the index processing performed by the recording apparatus 100.

Suppose that the content 401 in this example belong to the genre "News Program 5". Consequently, the rule that corresponds to "News Program 5" is obtained from the rule table 301.

The rule corresponding to "News Program 5" includes the operation IDs 001, 004, 002, and 010 in the stated order. Thus, when indexing of the content 401 is performed in accordance with the rule corresponding to "News Program 5", the first three detection operation instructions (of which operation IDs are 001, 004, and 002) are performed in the same way as the Example 1.

Thereafter, the detection operation instruction which is identified by the fourth operation ID 010 is processed. To this end, the speech-start detecting unit 148 detects all the speech-start frames from the content 401.

On completion of the speech-start frame detection, the start frame specifying unit 153 specifies a closest preceding frame to each presentation frame among all the detected speech-start frames. The start frame specifying unit 153 then registers the display time of each thus specified frame as a segment-start time to the index information.

The above steps ensure to suitably perform the indexing of such a news program in which a caption appears for each news story to present a headline thereof.

To be more specific, a presentation frame and a start frame are specified for each news story. Each presentation frame specified in this case is a frame in which a caption presenting the headline of a news story first appears. Each start frame specified in this case is a frame at which a report of the news story starts.

When the indexing is performed in accordance with the respective rules corresponding to "News Program 1", "News Program 3", "Music Show 1", and "News Program 5", the recording apparatus 100 detects detection-target frames from the entire content 401. That is to say, frames constituting CMs may be detected as detection-target frames. However, CMs are irreverent to a broadcast program, so that no CM frame is possibly specified either as a start frame or a presentation frame.

In view of the above, such a detection operation instruction may be first performed to detect all the CM frames from the content 401. Thus, subsequent detection operation instructions may be performed so as to detect target frames from the frames remaining after removing all the CM frames. In this way, the processing load imposed on the data analyzing unit 122 is reduced and thus the processing time is shortened.

In the case of the rule corresponding to "News Program 2", for example, it is instructed to first process the detection operation instruction for removing all the CM frames, and to subsequently process the detection operation instructions identified by the operation IDs 001, 002, and 003 one by one. Further, in the case of the rule corresponding to "News Program 4", it is instructed to first process the detection operation instruction for removing all the CM frames, and to subsequently process the detection operation instructions identified by the operation IDs 001, 002, and 005 one by one. In the case of the rule corresponding to "Music Show 2", it is instructed to first process the detection operation instruction for removing all the CM frames, and to subsequently perform the detection operation instructions identified by the operation IDs 001, 002, and 006 one by one. In the case of the rule corresponding to "News Program 6", it is instructed to first process the detection operation instruction for removing all the CM frames, and to subsequently perform the detection operation instructions identified by the operation IDs 001, 002, and 010 one by one.

Further, the recording apparatus 100 may perform the index processing in accordance with a rule other than the above mentioned rules.

For example, the detection operation instruction having the operation ID 001 may first be processed, so that the display time of each large-caption start frame is registered to the index information. Next, the detection operation instruction having the operation ID 004 is processed, so that the display time of each CM frame is removed if the same display time is registered to the index information. Next, the detection operation instruction having the operation ID 009 is processed. Thus, each frame corresponding to a registered presentation time is compared against the reference frame stored in the reference frame storage area of the rule storage unit 106. Based on the comparison, frames that are similar to the reference frame in terms of the position of a caption region are detected as similar-image frame, and the display time of each frame other than the thus detected similar-image frames is deleted from the index information. In this way, each frame of which display time remains registered is specified as a presentation frame.

Further, comparison may be made among frames each corresponding to a registered presentation time to see the overlapping degree of caption regions or the distance between centroids of caption regions. Based on the comparison, the frames of low similarity are deleted from the presentation frames, thereby reducing the number of presentation frames.

In yet another example, a first frame of each series of CM frames is detected from a content and specified as a start frame. In addition, transition frames are detected from the content. Then, for each specified start frame, a closest subsequent to each start frame among all the detected transition frames is specified as a presentation frame. In this way, each CM contained in the content is indexed as one segment.

As stated above, the recording apparatus 100 of the embodiment 1 detects using the feature frame detecting unit 123, transition frames, small-caption frames, large-caption start frames, silent frames, CM frames, music-start frames, and similar-image frames. However, the recording apparatus 100 may also detect frames having another feature.

Further, the detection operation instructions are not limited to the specific examples contained in the detection operation table 302 shown in FIG. 5. The recording apparatus 100 may be provided with other detection operation instructions instructing different operations.

Examples of such detection operation instructions include the following.

1. Detection operation instructions instructing to delete from the index information, each presentation time which is closest to a CM frame among all the presentation times preceding the CM frame.

2. Detection operation instructions instructing to delete from the index information, presentation times that falls within a predetermined time period preceding each CM frame;

3. Detection operation instructions instructing to delete from the index information, all the presentation times that falls within a predetermined time period, except the first one of the presentation times.

4. Detection operation instructions instructing to register the display time of each short-duration-caption start frame as a presentation time to the index information. A short-duration-caption start frame is a first frame of a series of frames during which a caption continuously appears in a predetermined display region but for a duration shorter than a predetermined time period.

5. Detection operation instruction instructing to delete each presentation time that matches the display time of a vertical-caption frame from the index information. A vertical-caption frame is a frame in which a caption of a vertical or top-to-bottom orientation appears in a predetermined display region.

6. Detection operation instructions instructing to delete from the index information, all the presentation times subsequent to a CM frame, except the closest presentation time to the CM frame.

7. Detection operation instructions instructing to detect the longest silent segment located within a predetermined time period preceding each presentation time, and specify a first frame of a series of frames constituting the longest silent segment. The display time of the thus specified frame is registered as a segment-start time to the index information.

8. Detection operation instructions instructing to detect each transition frame which at the same time is a silent frame. Among the thus detected frames, a closest preceding frame to each presentation frame is specified as a start frame and thus its display time is registered as a segment-start time to the index information.

9. Detection operation instructions instructing to detect a transition frame which at the same time is a music-start frame. Among the thus detected frames, a closest preceding frame to each presentation frame is specified as a start frame and thus its display time is registered a segment-start time to the index information.

Provision of the various detection operation instructions allows the recording apparatus 100 of the embodiment 1 to use suitable detection operation instructions in combination, for variety of contents each having different features. Consequently, segmentation of a content is carried out with high accuracy. The accuracy of segmentation used herein refers to how well the segmentation by the video processing apparatus matches the segmentation based on the structure of the content as perceived by human.

Note, the recording apparatus 100 of the embodiment 1 specifies start frames and presentation frames by sequentially performing a plurality of detection operation instructions. Alternatively, the recording apparatus 100 may first detect all the detection-target frames in accordance with all relevant detection operation instructions, and then select from the thus detected target frames, start frames and presentation frames satisfying the conditions shown by the detection operation instructions.

Further, it is not necessary to detect detection-target frames always from an entire content. Instead, the target frame detection may be performed for the frames preceding a known frame in time sequence. Suppose, for example, a closest preceding frame to a presentation frame among the transition frames is to be specified as a start frame. In this case, it is described above that transition frames are detected from an entire content and a closest preceding frame to a presentation frame is selected from the thus selected transition frames. Alternatively, it is applicable to detect a transition frame in a reverse time sequence starting from each presentation frame. The first transition frame detected is specified as a start frame. With this arrangement, the processing amount required for the video analysis is reduced.

Further, indexing of a content may be performed for a plurality of parts of the content in parallel. With this arrangement, the processing time taken for indexing the content is shortened.

Embodiment 2

In an embodiment 2, description is given to a playback apparatus 200 as an example of a video processing apparatus consistent with the present invention.

Figure 19:
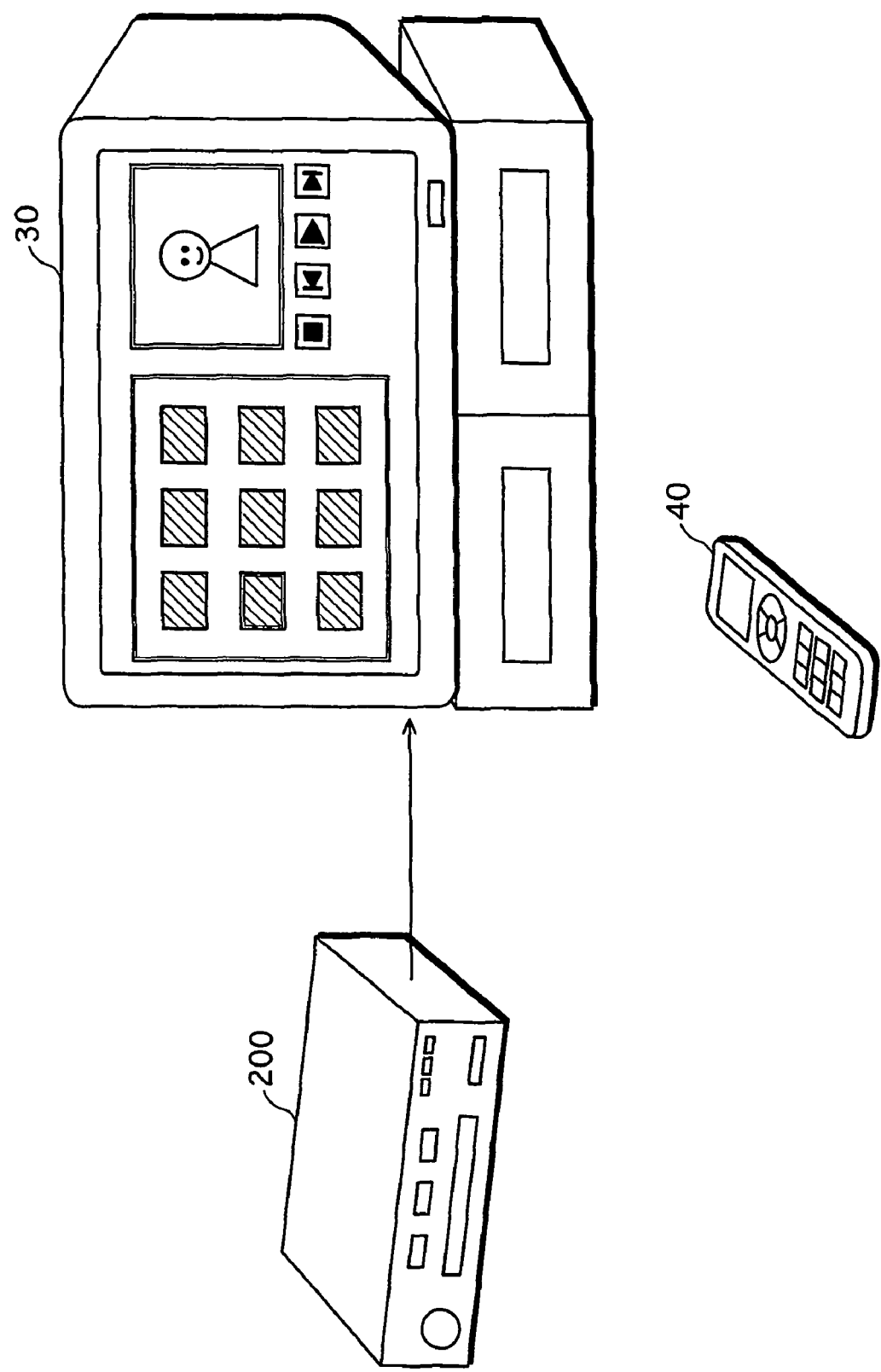
FIG. 19 is a view showing a usage pattern of a playback apparatus 200 according to an embodiment 2 of the present invention.

FIG. 19 shows a usage pattern of the playback apparatus 200.

The playback apparatus 200 has a function of playing back, on a monitor 30, a content stored in the content storage unit 103. In addition, the playback apparatus 200 has an indexing function of segmenting a content stored in the content storage unit 103 into a plurality of viewing segments, as well as a function of displaying thumbnail images of the presentation frames in list form on the monitor 30. Further, in response to a user operation to a remote controller 40, the playback apparatus 200 receives a user selection of one of the displayed thumbnail images, and plays back the content from the beginning of the viewing segment to which the presentation frame of the selected thumbnail image belongs.

Figure 20:
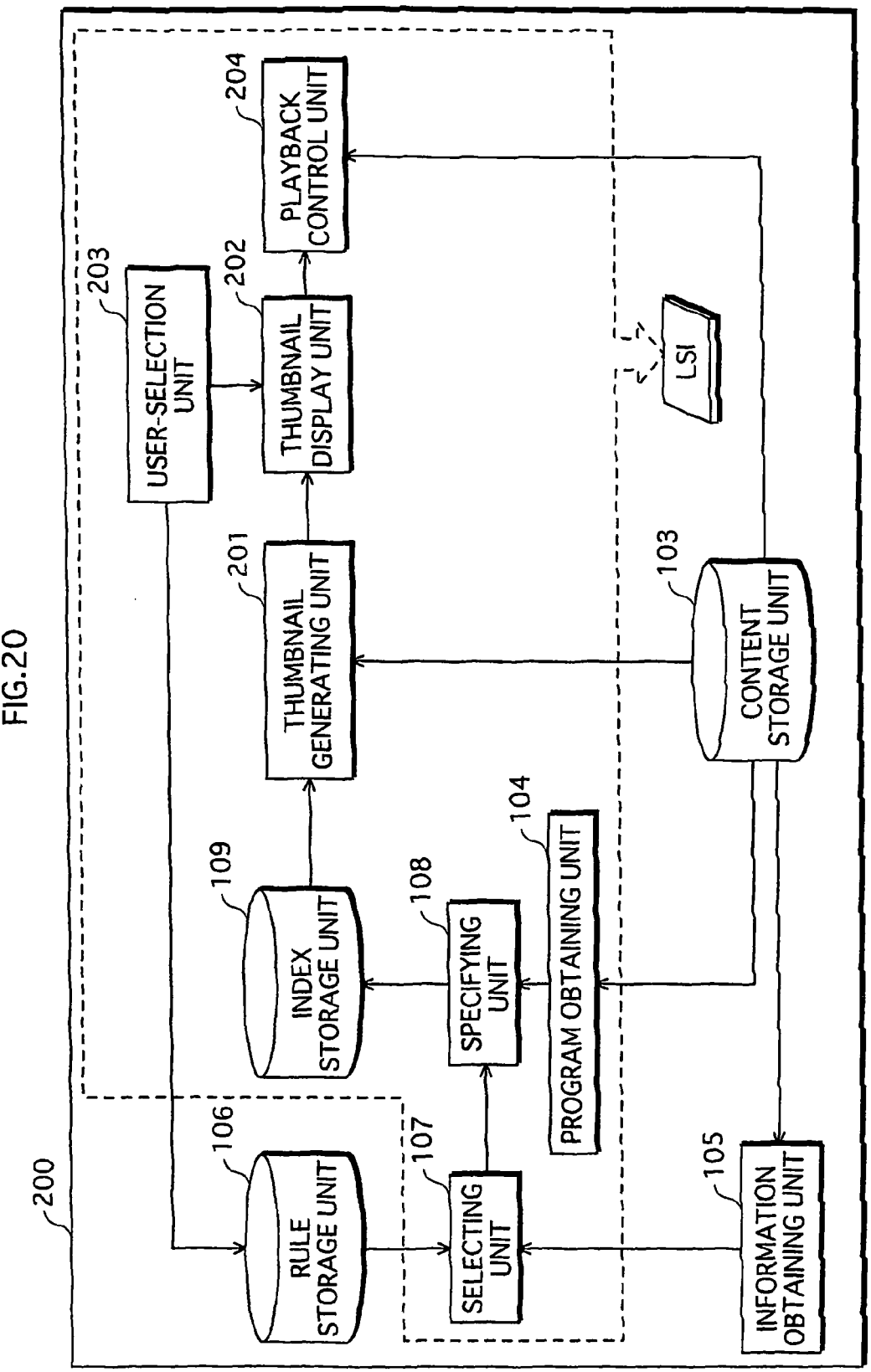
FIG. 20 is a view showing functional blocks of the playback apparatus 200.

FIG. 20 shows the functional blocks of the playback apparatus 200.

The playback apparatus 200 is different from the recording apparatus 100 in that the receiving unit 101 and the recording unit 102 relating to the recording function are removed, and that a thumbnail generating unit 201, a thumbnail display unit 202, a user-selection unit 203, and a playback control unit 204 relating to a playback function are added.

In FIG. 20, the same reference numerals are used to denote the same functional blocks as the recording apparatus 100. Thus, descriptions of those functional blocks are omitted.

The thumbnail generating unit 201 is a functional block for generating thumbnail images of the presentations frames of a content. The thumbnail images are used as representative still images for the respective viewing segments. The thumbnail generating unit 201 refers to the presentation time of each viewing segment shown by the index information stored in the information storage unit 109 in order to retrieve the presentation frame of each viewing segment from the image data of the content stored in the content storage unit 103. The thumbnail generating unit 201 then generates a thumbnail image from the thus obtained presentation frame.

The thumbnail display unit 202 is a functional block for displaying the thumbnail images generated for each viewing segments by the thumbnail generating unit 201. The thumbnail images are displayed on the monitor 30 in list form. In addition, the thumbnail display unit 202 manages, for each thumbnail image, the segment-start time and presentation time of a corresponding viewing segment. On receiving a user-selection of a thumbnail image from the user-selection unit 203, the thumbnail display unit 202 notifies the playback control unit 204 about the segment-start time of the thumbnail image selected by the user.

The user-selection unit 203 is a functional block for receiving a user operation, accordingly selecting one or more of the displayed thumbnail images, and notifying the thumbnail display unit 202 about the selected thumbnail image(s). Further, on selecting a thumbnail image, the user-selection unit 203 records the selected thumbnail image to the reference frame storage area of the rule storage unit 106.

The playback control unit 204 is a functional block for controlling playback of a content. On receiving a notification of a segment-start time, the playback control unit 204 plays back the content stored in the content storage unit 103 starting from a frame that corresponds to the received segment-start time.

With the above structure, the playback apparatus 200 displays thumbnail images in list form. The thumbnail images are of frames from which users can readily tell what is recorded in a respective viewing segment (i.e. presentation frame) with its caption, for example. When a user select one of the thumbnail images displayed, the playback apparatus 200 plays back the content starting not from a frame corresponding to the selected thumbnail image (i.e. the presentation frame) but from the beginning (i.e. the start frame) of a viewing segment to which the selected thumbnail image belongs.

Hereinafter, by way of the content 401 shown in FIG. 9, specific description is given to the thumbnail display processing and playback processing. Here, suppose that the content 401 is already indexed and thus the index storage unit 109 stores the index information of the content 401.

First, the thumbnail generating unit 201 refers to the index information stored in the index information unit 109 to obtain the presentation times of the content 401. The thumbnail generating unit 201 then obtains a frame of which display time corresponds to each presentation time, and generates a thumbnail image of the thus obtained frame.

To be more specific, four presentation times "00:45", "19:30", "30:30", and "51:15" are registered to the index information, so that four thumbnail images are generated from four presentation frames corresponding the registered presentation times.

The thumbnail display unit 202 obtains the thumbnail images generated by the thumbnail generating unit 201, and displays the obtained images in list form on the monitor 30.

The user-selection unit 203 selects one of the thumbnail images in accordance with a user-selection. Further, the user-selection unit 203 notifies the thumbnail display unit 202 about the selected thumbnail image, and records the selected thumbnail image to the reference frame storage area of the rule storage unit 106. Here, it is applicable to record information specifying a frame of the content 401 from which the selected thumbnail image is generated without the image data of the selected thumbnail image.

On receiving the notification from the user-selection unit 203 about the selected thumbnail image, the thumbnail display unit 202 notifies the playback control unit 204 about the segment-start time of a frame corresponding to the selected thumbnail image.

The playback control unit 204 plays back the content 401 starting from the notified segment-start time.

To be more specific, when the selected thumbnail image is the one generated from the frame corresponding to the presentation time "00:45", playback of the content 401 is started from the segment-start time 00:00. When the selected thumbnail image is the one generated from the frame corresponding to the presentation time "19:30", playback of the content 401 is started from the segment-start time 19:00. When the selected thumbnail image is the one generated from the frame corresponding to the presentation time "30:30", playback of the content 401 is started from the segment-start time "30:30". When the selected thumbnail image is the one generated from the frame corresponding to the presentation time "51:15", playback of the content 401 is started from the segment-start time 50:00.

In the case where more than one thumbnail image is selected by the user-selection unit 203, the selected thumbnail images are all recorded to the reference frame storage area of the rule storage unit 106.

Further, the playback control unit 204 may be provided with a playlist function for sequential playback of the viewing segments. Thus, in the case where more than one thumbnail image is selected, the playback control unit 204 sequentially plays back the viewing segments corresponding to the selected thumbnail images.

Embodiment 3

Overview

Compression coding of data into MPEG-2 format involves image and audio data analyses in order to measure features. In an embodiment 3, the segmentation of a content is performed based on the analyses of image and audio data that are made in the process of compression coding. With this arrangement, a specifying unit can be simplified. Description below is given to a recording apparatus with such a simplified specifying unit.

Structure

Figure 21:
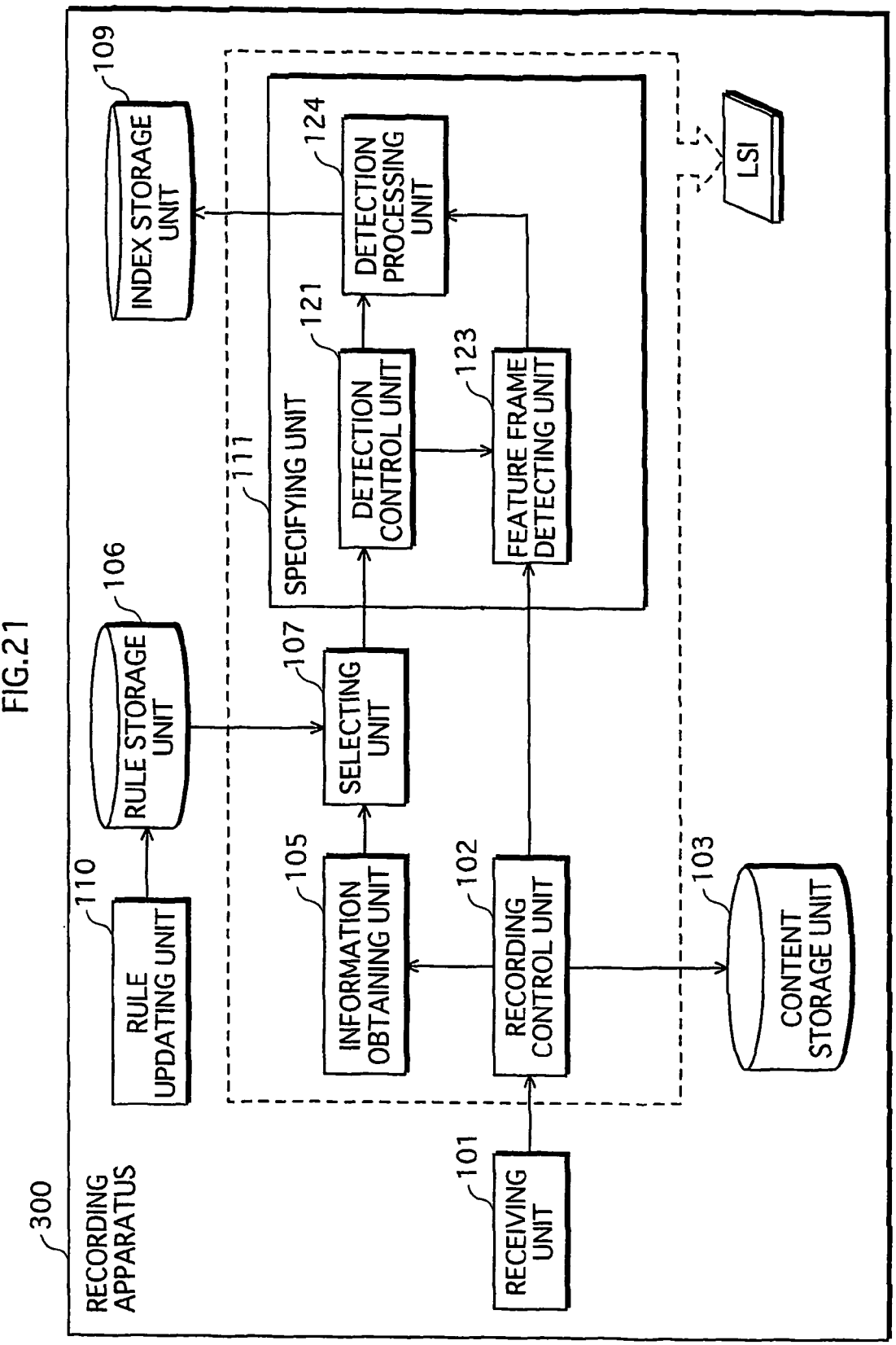
FIG. 21 is a functional blocks of a recording apparatus 300 according to an embodiment 3 of the present invention.

FIG. 21 shows the functional blocks of a recording apparatus 300 according to the embodiment 3 of the present invention. The recording apparatus 300 is different from the recording apparatus 100 in that the program obtaining unit 104 is removed, and the specifying unit 108 is replaced with a specifying unit 111. In FIG. 21, the same reference numerals are used to denote the same functional blocks as the recording apparatus 100. Thus, descriptions of those functional blocks are omitted.

The specifying unit 111 is different from the specifying unit 108 in that the data analyzing unit 122 is removed. The specifying unit 111 obtains the image and audio data analyses that are obtained in the process of compression coding a content. The specifying unit 111 then generates index information of the content using the thus obtained analyses.

With the above structure, the recording apparatus 300 generates index information of a content using analyses obtained in the process of recording the content. In addition, the generation of index information is performed in parallel with recording of the content. This allows the recording apparatus 300 to be simplified in structure in comparison with that of the playback apparatus 200.

Further, without the need for audio and image analyses of a recorded content, the indexing is performed by processing a smaller amount of data than would otherwise be required.

Modifications

The present invention has been described by way of the above embodiments. Yet, it is naturally appreciated that the present invention is not limited to those specific embodiments and various modifications including the following still fall within the scope of the present invention.

(1) The present invention may be embodied as the methods described above. Further, the present invention may be embodied as computer programs realizing the methods by a computer, or digital signals representing the computer programs.

Further, the present invention may be embodied as a computer-readable recording medium storing the computer programs or the digital signals. Examples of such a recording medium include a flexible disk, a hard disk, CD-ROM, MO, DVD, DVD-ROM, DVD-RAM, BD (Blu-ray Disc) and a semiconductor memory.

Still further, the present invention may be embodied as the computer program or the digital signal recorded on any recording medium mentioned above.

Still further, the present invention may be embodied as the computer programs or the digital signals transmitted via an electric communication line, wireless communications, a wired communication line, or a network typified by the Internet.

Still further, the present invention may be embodied as a computer system composed of a microprocessor and memory. The memory stores the computer programs mentioned above, and the microprocessor may operate according to the computer programs.

Still further, the programs or the digital signals may be transferred in form of a recording medium mentioned above, or via a network mentioned above, so that the programs or the digital signals may be executed by another independent computer system.

(2) The present invention may be embodied as an LSI controlling the video processing apparatus. Such an LSI may be realized, as shown in FIGS. 2, 20, and 21, by integrating part or all of the functional blocks enclosed within a dotted box. The functional blocks may be integrated as separate IC chips or together as a single-chip IC.

Figure 22:
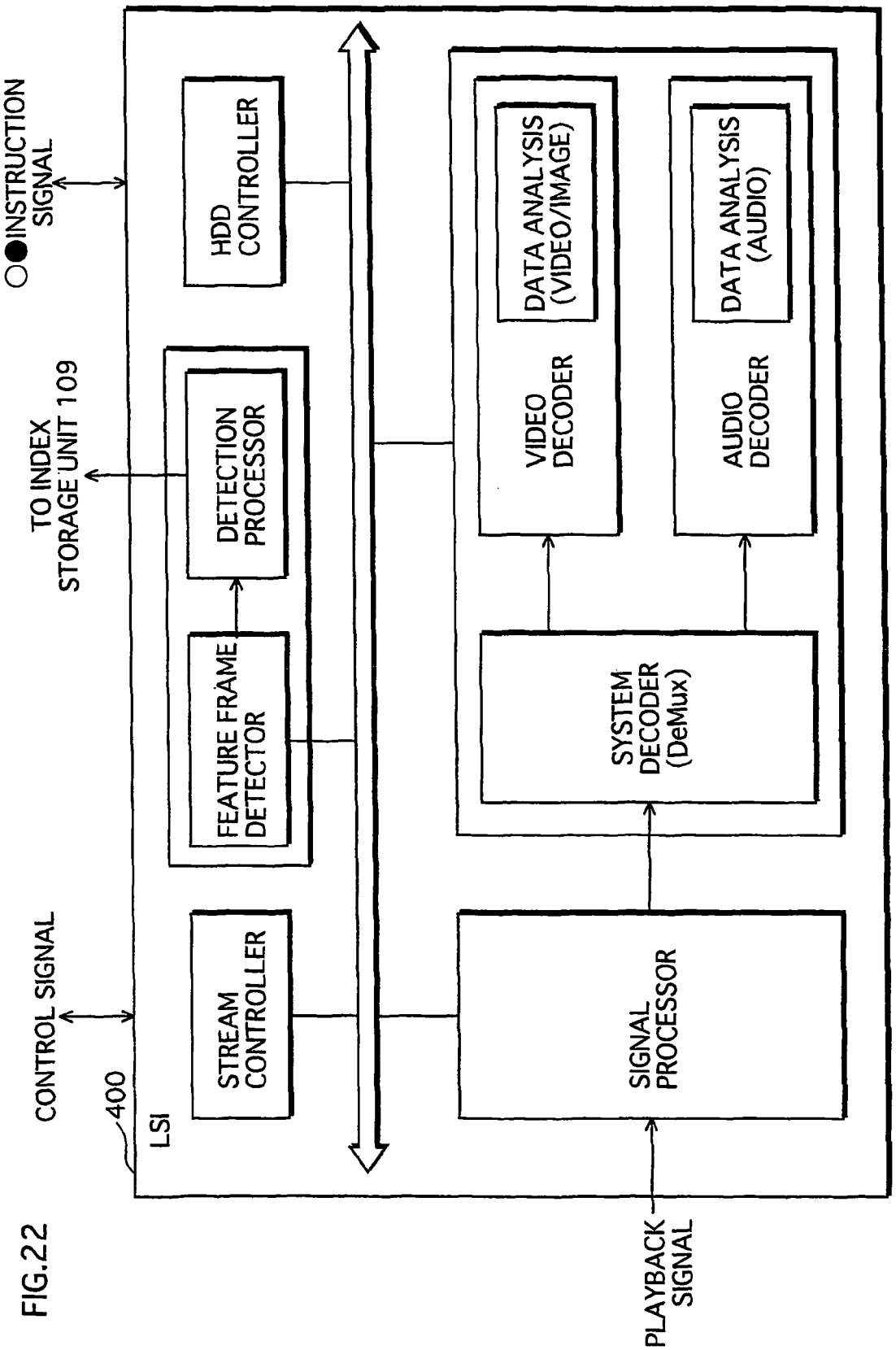
FIG. 22 is a view showing an LSI 400 implemented as a specifying unit 108 of the embodiment 2.

For example, FIG. 22 shows an LSI 400 implemented as the specifying unit 108 of the embodiment 2. On receiving a command for indexing, the LSI 400 analyzes playback signals read from the content storage unit 103 to generate index information, and outputs the index information to the index storage unit 109.

Figure 23:
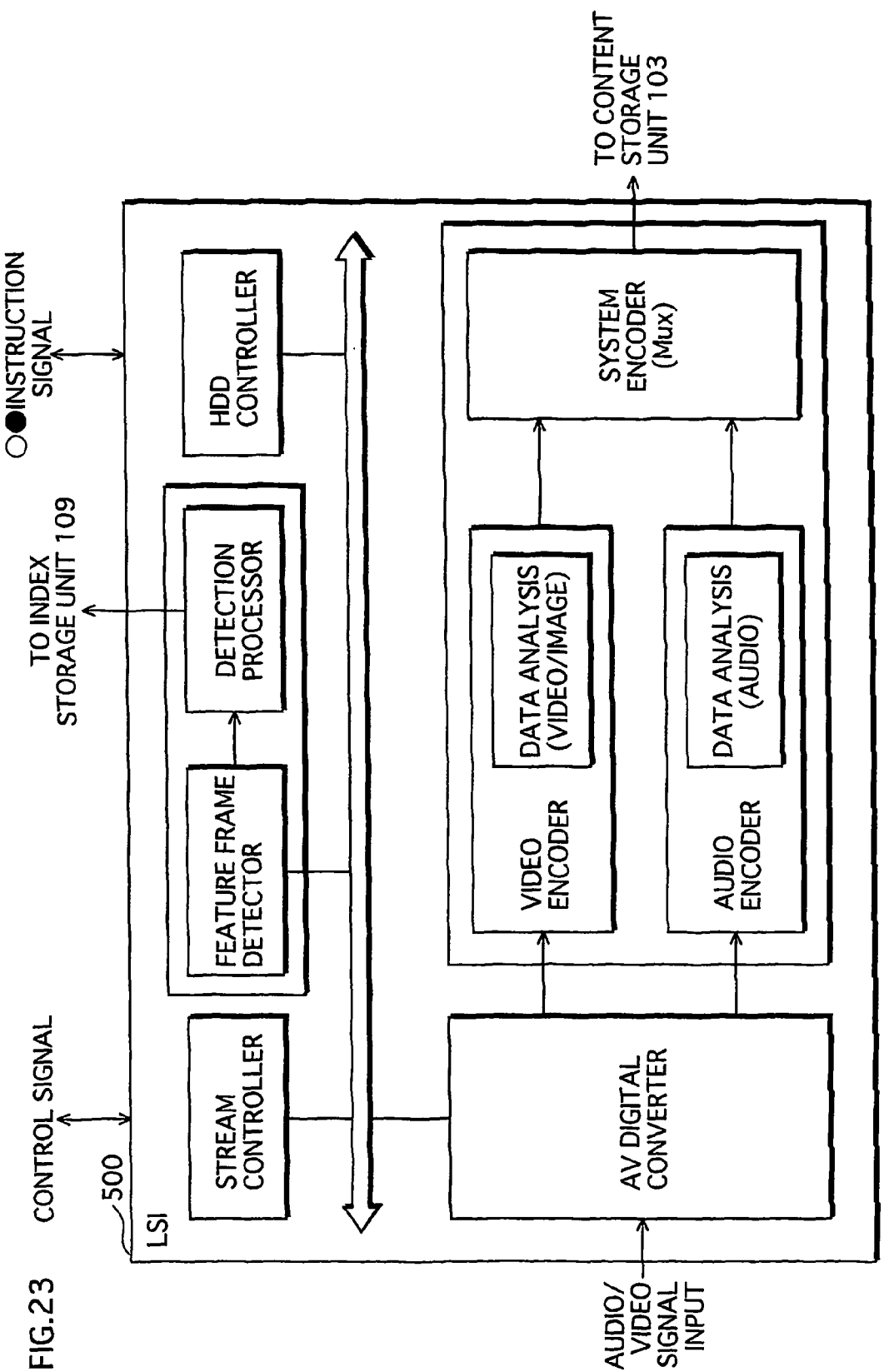
FIG. 23 is an LSI 500 implemented as a recording control unit 102 and a specifying unit 111 of the embodiment 3.

FIG. 23 shows an LSI 500 implemented as the recording control unit 102 and the specifying unit 111 of the embodiment 3. On receiving a command for recording, the LSI 500 digitizes the audio and video data received by the receiving unit 101, and encodes the digitized data by audio and video encoders to generate elementary streams (hereinafter "ES"). Then, the LSI 500 multiplexes the audio ES and video ES using the system encoder, thereby generating a program stream (hereinafter, "PS"). The thus generated PS is then outputted to the content storage unit 103. A recording command may be attached with a tag instructing to perform indexing. On receiving a recording command attached with such a tag, the LSI 500 uses the analyses obtained by the audio and video encoders in the process of compression coding, to generate index information with the feature frame detecting unit and the detection processing unit. The generated index information is outputted to the index information storage unit 109.

Here, the LSI given as an example may be referred to as an IC, a system LSI, a super LSI, or an ultra LSI, depending on the scale of integration.

Also, the integration scheme is not limited to large-scale integration, and may be realized as a dedicated circuit or a general-purpose processor. Alternatively, a FPGA (field programmable gate array) programmable after the LSI has been manufactured, a reconfigurable processor capable of reconfiguring the connections and settings of circuit cells within an LSI, or the like, may be employed.

Further, if integration technology that replaces large-scale integration becomes available as a result of advances in semiconductor technology or the advent of derivative technology, the integration of the functional blocks may naturally be performed using this technology. The application of biotechnology or the like in this area is also a possibility.

(3) It is naturally appreciated that the present invention is not limited to the recording apparatus and playback apparatus. The present invention is also applicable to a recording/playback apparatus that is provided with functional blocks of both the recording apparatus 100 and playback apparatus 200.

(4) In the above embodiments, it is described that contents are received over the broadcast waves. Examples of broadcasting include terrestrial analog broadcasting, satellite broadcasting, satellite digital broadcasting, and cable broadcasting. Alternatively, contents may be distributed on demand over a communication network typified by the Internet. Alternatively, contents may be obtained from information recorded on a recording medium, such as a DVD, a CD, or an SD card. Alternatively, contents may be video data shot by a user with a home-video.

(5) In the above embodiments, each piece of specifying information corresponds to a genre of contents. Alternatively, each piece of specifying information may correspond directly to a title of broadcast program.

Further, some pieces of specifying information may correspond directly to broadcast programs, while some other pieces correspond to genres of broadcast programs. Having both types of specification information stored in the rule storage unit, the index processing of a content is performed in accordance with a piece of specifying information selected based on the broadcast program title in the case where there is such a piece stored. If not, a suitable piece of specifying information is then selected based on the genre.

(6) The recording apparatus according to the above embodiments may start indexing of a content upon completion of a recording process of the content. Alternatively, the indexing may be started upon starting the recording process.

In the case where the indexing starts upon starting the recording process, the content may be sequentially obtained part by part for every predetermined period of recording or for every predetermined amount of recorded data. Each time part of the content is obtained, indexing is performed for that obtained part. Such index processing is carried out when so-called "Chasing Playback" function is performed using a write buffer and a read buffer, and by alternately performing the following two steps.

Step 1: To record the data held in the write buffer to the content storage unit, and to perform the index processing for the data held in the read buffer.

Step 2: To write part of the content to the write buffer and read the written part of the content from the content storage unit to the read buffer.

(7) The recording apparatuses according to the above embodiments may update a piece of specifying information corresponding to a predetermined content at the time when recording of the predetermined content is preset.

Further, the recording apparatus of the above embodiments may periodically inquire the provider apparatus as to where there is a new version of specifying information available. On receiving an affirmative response, the recording apparatus may obtain the new version of specifying information.

Further, the recording apparatus of the above embodiments may periodically obtain the latest version of specifying information. In accordance with the thus obtained latest version, the recording apparatus re-indexes the content which has been already indexed in accordance with an earlier version of specifying information.

(8) In the embodiments above, each piece of specifying information is composed of a rule and a plurality of detection operation instructions. Yet, specifying information is not limited to the above specific embodiments and may be realized in other forms.

The specifying information may take any form as long as the following are included: a plurality of algorithms each for detecting frames having a specific feature; an execution sequence of the algorithms; and parameters showing the features. For example, the specifying information may be a machine language program describing a sequence for specifying presentation frames and start frames.

(9) Further, the above embodiments and modifications may be used in varying combinations.

The present invention is applicable for example to a recording apparatus for segmenting a recorded content into a plurality of viewing segments and playing back the content on a segment-by-segment basis.

The invention claimed is:

1. A video processing apparatus for specifying frames of content to be start frames of a plurality of viewing segments of the content, when segmenting the content into the plurality of viewing segments, the video processing apparatus comprising:
  a specifying information memory, which is a physical memory storing a plurality of pieces of specifying information, each piece of specifying information of the plurality of pieces of specifying information (i) corresponding to a different type of content, and (ii) including:
    a first condition identifying a feature of frames of the content to be detected as candidates for presentation frames, each of the presentation frames for being displayed as a representative still image of a respective viewing segment of the plurality of viewing segments;
    an exclusion condition identifying a feature of frames of the content to be excluded from being the candidates for the presentation frames;
    a second condition identifying a feature of frames of the content to be detected as candidates for start frames; and
    a selection condition identifying a relationship between a presentation frame of the content and a frame of the content that is to be selected as a start frame;
  a content obtaining unit operable to obtain a content;
  an information obtaining unit operable to obtain type information identifying the type of the obtained content;
  an extracting unit operable to extract, from the specifying information memory, a piece of specifying information, of the plurality of pieces of specifying information, that corresponds to the type of the content identified by the obtained type information; and
  a specifying unit operable, in accordance with the extracted piece of specifying information, to (i) specify the presentation frames of the content by detecting, from all frames of the content, frames of the content satisfying the first condition and by subsequently excluding, from the detected frames satisfying the first condition, frames satisfying the exclusion condition, and (ii) specify start frames of the content by detecting, from all frames of the content, frames of the content satisfying the second condition and by subsequently selecting, from the detected frames satisfying the second condition, frames satisfying the relationship identified by the selection condition with respect to the specified presentation frames,
  wherein specifying unit includes:
    a plurality of detecting subunits, each detecting subunit of the plurality of detecting subunits being operable to detect frames of the content having a different feature;
    an excluding subunit operable to exclude, from the detected frames satisfying the first condition, frames satisfying the exclusion condition; and
    a selecting subunit operable to select, from the detected frames satisfying the second condition, frames satisfying the relationship identified by the selection condition, wherein each of the first condition, the exclusion condition, and the second condition is an identifier to be used by one detecting subunit of the plurality of detecting subunits, and wherein, when operating in accordance with the extracted piece of specifying information corresponding to the type of the content identified by the obtained type information, the specifying unit (i) detects, from all frames of the content, a plurality of large-caption start frames, each large-caption start frame, of the plurality of large-caption start frames, being a first frame of a series of frames of the content during which a caption of a size larger than a threshold continuously appears in a predetermined region, and (ii) specifies, as a presentation frame of the content, each large-caption start frame, of the plurality of large-caption start frames, remaining after removing, from the plurality of large-caption start frames, small-caption frames having a caption of a size smaller than a threshold appearing in a region other than the predetermined region.

2. The video processing apparatus of claim 1, further comprising an index storage unit operable to store, in correspondence with the content, a respective display time of each of the specified start frames of the content and each of the specified presentation frames of the content.

3. The video processing apparatus of claim 1, wherein, when operating in accordance with the extracted piece of specifying information corresponding to the type of the content identified by the obtained type information, the specifying unit (i) detects, from all frames present in the content, a plurality of transition frames, each transition frame, of the plurality of transition frames, being (a) a first frame of a series of frames of the content of similar images, (b) silent frames of the content having audio data below a predetermined volume level, (c) music-start frames of the content having a first frame of a series of frames of the content having audio data representing a piece of music data, or (d) speech-start frames having a first frame of a series of frames of the content having audio data representing a speech of a specific speaker and (ii) specifies as a start frame of the content, for each presentation frame of the content, a frame of the content closest to the presentation frame among all of the detected frames preceding the presentation frame.

4. The video processing apparatus of claim 1, further comprising a playback unit operable to play back the content starting from a start frame of the content specified by the specifying unit.

5. The video processing apparatus of claim 4,
wherein the video processing apparatus further comprises:
an index storing unit operable to store pairs of display times of each start frame and presentation frame specified for a respective viewing segment, of the plurality of viewing segments, by the specifying unit;
a display unit operable to display a presentation frame specified for each viewing segment, of the plurality of viewing segments, by the specifying unit; and
a user-selection unit operable to select, in accordance with a user selection, at least one of the displayed presentation frames, and
wherein the playback unit plays back the content starting from a start frame of a viewing segment, of the plurality of viewing segments, to which the user-selected presentation frame belongs.

6. The video processing apparatus of claim 5, wherein the display unit displays the presentation frames specified for the plurality of viewing segments by generating a thumbnail image of each presentation frame of the presentation frames of the content and displaying the generated thumbnail images in list form.

7. The video processing apparatus of claim 5,
wherein the user-selection unit stores the at least one of the selected presentation frames as a reference image into the specifying information memory, and
wherein the specifying unit specifies the presentation frames by detecting frames of the content similar to the reference image with respect to a location of a region in which a caption appears.

8. The video processing apparatus of claim 1,
wherein the video processing apparatus includes a recording unit operable to obtain a content and type information of the content, and to record the content to a recording medium in correspondence with the type information,
wherein after the recording unit records the type information and at least a part of the content, the content obtaining unit sequentially obtains the part of the content from the recording medium, and
wherein the specifying unit sequentially specifies a start frame present in the part of the content obtained by the content obtaining unit.

9. The video processing apparatus of claim 1,
wherein the video processing apparatus comprises a recording unit operable to obtain a content and type information of the content, encode the content, and record the encoded content in correspondence with the type information,
wherein, after the recording unit records the type information and encodes at least a part of the content, the content obtaining unit sequentially obtains the encoded part of the content, and
wherein the specifying unit obtains an analysis of the encoded part of the content, and sequentially specifies a start frame present in the encoded part of the content using the obtained analysis.

10. The video processing apparatus of claim 1, further comprising an updating unit operable to obtain a new version of a piece of specifying information, of the plurality of pieces of specifying information, that corresponds to a specific type of content, and operable to record the new version of the piece of specifying information to the specifying information memory.

11. The video processing apparatus of claim 10,
wherein the updating unit obtains the new version of the piece of specifying information when the video processing apparatus is connected, via a communication network, to a provider apparatus for providing specifying information, and judges that the new version of the piece of specifying information is available, and
wherein the new version of the piece of specifying information is recorded to the specifying information memory by updating, to the new version of the piece of specifying information, a stored piece of specifying information, of the plurality of pieces of specifying information, that corresponds to the specific type.

12. The video processing apparatus of claim 11, wherein a judgment as to whether the new version of the piece of specifying information is available is made each time the specifying unit processes the specific type of content.

13. An integrated circuit for use in a video processing apparatus that specifies frames of content to be start frames of a plurality of viewing segments of the content, when segmenting the content into the plurality of viewing segments, the video processing apparatus having a specifying information memory storing a plurality of pieces of specifying information, each piece of specifying information of the plurality of pieces of specifying information corresponding to a different type of content and including (i) a first condition identifying a feature of frames of the content to be detected as candidates for presentation frames, each of the presentation frames for being displayed as a representative still image of a respective viewing segment of the plurality of viewing segments, (ii) an exclusion condition identifying a feature of frames of the content to be excluded from being the candidates for the presentation frames, (iii) a second condition identifying a feature of frames of the content to be detected as candidates for start frames, and (iv) a selection condition identifying a relationship between a presentation frame of the content and a frame of the content that is to be selected as a start frame, the integrated circuit comprising:

a content obtaining module operable to obtain a content;

an information obtaining module operable to obtain type information identifying the type of the obtained content;

an extracting module operable to extract, from the specifying information memory, a piece of specifying information, of the plurality of pieces of specifying information, that corresponds to the type of the content identified by the obtained type information; and a specifying module operable, in accordance with the extracted piece of specifying information, to (i) specify the presentation frames of the content by detecting, from all frames of the content, frames of the content satisfying the first condition and by subsequently excluding, from the detected frames satisfying the first condition, frames satisfying the exclusion condition, and (ii) specify start frames of the content by detecting, from all frames of the content, frames of the content satisfying the second condition and by subsequently selecting, from the detected frames satisfying the second condition, frames satisfying the relationship identified by the selection condition with respect to the specified presentation frames, wherein specifying module includes:

a plurality of detecting submodules, each detecting submodule of the plurality of detecting submodules being operable to detect frames of the content having a different feature;

an excluding submodule operable to exclude, from the detected frames satisfying the first condition, frames satisfying the exclusion condition; and a selecting submodule operable to select, from the detected frames satisfying the second condition, frames satisfying the relationship identified by the selection condition, wherein each of the first condition, the exclusion condition, and the second condition is an identifier to be used by one detecting submodule of the plurality of detecting submodules, and wherein, when operating in accordance with the extracted piece of specifying information corresponding to the type of the content identified by the obtained type information, the specifying module (i) detects, from all frames of the content, a plurality of large-caption start frames, each large-caption start frame, of the plurality of large-caption start frames, being a first frame of a series of frames of the content during which a caption of a size larger than a threshold continuously appears in a predetermined region, and (ii) specifies, as a presentation frame of the content, each large-caption start frame, of the plurality of large-caption start frames, remaining after removing, from the plurality of large-caption start frames, small-caption frames having a caption of a size smaller than a threshold appearing in a region other than the predetermined region.

14. A video processing method for use by a video processing apparatus that specifies frames of content to be start frames of a plurality of viewing segments of the content, when segmenting the content into the plurality of viewing segments, the video processing apparatus having a specifying information memory storing a plurality of pieces of specifying information, each piece of specifying information of the plurality of pieces of specifying information corresponding to a different type of content and including (i) a first condition identifying a feature of frames of the content to be detected as candidates for presentation frames, each of the presentation frames for being displayed as a representative still image of a respective viewing segment of the plurality of viewing segments, (ii) an exclusion condition identifying a feature of frames of the content to be excluded from being the candidates for the presentation frames, (iii) a second condition identifying a feature of frames of the content to be detected as candidates for start frames, and (iv) a selection condition identifying a relationship between a presentation frame of the content and a frame of the content that is to be selected as a start frame, the video processing method comprising:

obtaining a content;

obtaining type information identifying the type of the obtained content;

extracting, from the specifying information memory, a piece of specifying information, of the plurality of pieces of specifying information, that corresponds to the type of the content identified by the obtained type information;

specifying, in accordance with the extracted piece of specifying information, presentation frames of the content by detecting, from all frames of the content, frames of the content satisfying the first condition and by subsequently excluding, from the detected frames satisfying the first condition, frames satisfying the exclusion condition;

specifying, in accordance with the extracted piece of specifying information, start frames of the content by detecting, from all frames of the content, frames of the content satisfying the second condition and by subsequently selecting, from the detected frames satisfying the second condition, frames satisfying the relationship identified by the selection condition with respect to the specified presentation frames, detecting, via each of a plurality of detecting subunits, frames of the content having a different feature;

excluding, via an excluding subunit and from the detected frames satisfying the first condition, frames satisfying the exclusion condition; and selecting, via a selecting subunit and from the detected frames satisfying the second condition, frames satisfying the relationship identified by the selection condition, wherein each of the first condition, the exclusion condition, and the second condition is an identifier to be used by one detecting subunit, of the plurality of detecting subunits, when performing the detecting, and wherein, when operating in accordance with the extracted piece of specifying information corresponding to the type of the content identified by the obtained type information, the video processing method (i) detects, from all frames of the content, a plurality of large-caption start frames, each large-caption start frame, of the plurality of large-caption start frames, being a first frame of a series of frames of the content during which a caption of a size larger than a threshold continuously appears in a predetermined region, and (ii) specifies, as a presentation frame of the content, each large-caption start frame, of the plurality of large-caption start frames, remaining after removing, from the plurality of large-caption start frames, small-caption frames having a caption of a size smaller than a threshold appearing in a region other than the predetermined region.

15. A non-transitory computer-readable recording medium have a video processing program recorded thereon, the video processing program for causing a device to specify frames of content to be start frames of a plurality of viewing segments of the content, when segmenting the content into the plurality of viewing segments, the device having a specifying information memory storing a plurality of pieces of specifying information, each piece of specifying information of the plurality of pieces of specifying information corresponding to a different type of content and including (i) a first condition identifying a feature of frames of the content to be detected as candidates for presentation frames, each of the presentation frames for being displayed as a representative still image of a respective viewing segment of the plurality of viewing segments, (ii) an exclusion condition identifying a feature of frames of the content to be excluded from being the candidates for the presentation frames, (iii) a second condition identifying a feature of frames of the content to be detected as candidates for start frames, and (iv) a selection condition identifying a relationship between a presentation frame of the content and a frame of the content that is to be selected as a start frame, the video processing program causing a computer to execute a method comprising:

obtaining a content;

obtaining type information identifying the type of the obtained content;

extracting, from the specifying information memory, a piece of specifying information, of the plurality of pieces of specifying information, that corresponds to the type of the content identified by the obtained type information;

specifying, in accordance with the extracted piece of specifying information, presentation frames of the content by detecting, from all frames of the content, frames of the content satisfying the first condition and by subsequently excluding, from the detected frames satisfying the first condition, frames satisfying the exclusion condition;

specifying, in accordance with the extracted piece of specifying information, start frames of the content by detecting, from all frames of the content, frames of the content satisfying the second condition and by subsequently selecting, from the detected frames satisfying the second condition, frames satisfying the relationship identified by the selection condition with respect to the specified presentation frames, detecting, via each of a plurality of detecting subunits, frames of the content having a different feature;

excluding, via an excluding subunit and from the detected frames satisfying the first condition, frames satisfying the exclusion condition; and selecting, via a selecting subunit and from the detected frames satisfying the second condition, frames satisfying the relationship identified by the selection condition, wherein each of the first condition, the exclusion condition, and the second condition is an identifier to be used by one detecting subunit, of the plurality of detecting subunits, when performing the detecting, and wherein, when operating in accordance with the extracted piece of specifying information corresponding to the type of the content identified by the obtained type information, the method executed by the computer (i) detects, from all frames of the content, a plurality of large-caption start frames, each large-caption start frame, of the plurality of large-caption start frames, being a first frame of a series of frames of the content during which a caption of a size larger than a threshold continuously appears in a predetermined region, and (ii) specifies, as a presentation frame of the content, each large-caption start frame, of the plurality of large-caption start frames, remaining after removing, from the plurality of large-caption start frames, small-caption frames having a caption of a size smaller than a threshold appearing in a region other than the predetermined region.

* * * * *